(12) United States Patent
Sugio

(10) Patent No.: US 9,774,830 B2
(45) Date of Patent: Sep. 26, 2017

(54) IMAGING APPARATUS AND IMAGING METHOD

(75) Inventor: Toshiyasu Sugio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 488 days.

(21) Appl. No.: 13/213,136

(22) Filed: Aug. 19, 2011

(65) Prior Publication Data

US 2012/0044347 A1    Feb. 23, 2012

(30) Foreign Application Priority Data

Aug. 20, 2010  (JP) ................................ 2010-184600

(51) Int. Cl.
| | |
|---|---|
| *G02B 7/04* | (2006.01) |
| *G02B 7/06* | (2006.01) |
| *G02B 7/09* | (2006.01) |
| *H04N 7/18* | (2006.01) |
| *H04N 5/232* | (2006.01) |

(52) U.S. Cl.
CPC ......... *H04N 7/183* (2013.01); *H04N 5/23296* (2013.01)

(58) Field of Classification Search
CPC ... G02B 7/08; G02B 7/06; G02B 7/04; G06K 9/40; H04N 9/79
See application file for complete search history.

(56) References Cited

U.S. PATENT DOCUMENTS

| | | | |
|---|---|---|---|
| 5,245,371 A | 9/1993 | Nagano et al. | |
| 5,546,158 A | 8/1996 | Konishi et al. | |
| 5,589,908 A | 12/1996 | Irie | |
| 5,758,201 A | 5/1998 | Watanabe et al. | |
| 7,701,492 B2 | 4/2010 | Motomura et al. | |
| 8,357,101 B2 | 1/2013 | Sugio et al. | |
| 8,419,654 B2 | 4/2013 | Sugio et al. | |
| 2004/0146183 A1* | 7/2004 | Shimoni | 382/103 |
| 2005/0195277 A1 | 9/2005 | Yamasaki | |
| 2006/0217816 A1* | 9/2006 | Pesaran et al. | 623/25 |
| 2007/0262917 A1* | 11/2007 | Otsuki et al. | 345/8 |
| 2007/0297687 A1* | 12/2007 | Yamasaki | 382/255 |
| 2008/0006651 A1* | 1/2008 | Arakawa et al. | 222/52 |
| 2009/0268079 A1 | 10/2009 | Motomura et al. | |

(Continued)

FOREIGN PATENT DOCUMENTS

| | | | | |
|---|---|---|---|---|
| JP | H04-213416 | * | 4/1992 | ............ G02B 7/08 |
| JP | 04-335606 | | 11/1992 | |

(Continued)

*Primary Examiner* — Behrooz Senfi
*Assistant Examiner* — Maryam Nasri
(74) *Attorney, Agent, or Firm* — Wenderoth, Lind & Ponack, L.L.P.

(57) ABSTRACT

An imaging apparatus appropriately determines a zoom angle of view in the case where the imaging apparatus is worn on the head of a user, and the imaging apparatus is worn on the head of the user, including a sight line direction detection unit which detects sight line direction of the user, a zoom angle determination unit which determines a zoom angle of view such that the zoom angle of view becomes smaller as variations in the sight line direction decrease, and an imaging unit which captures an image of a subject according to the determined zoom angle of view.

8 Claims, 19 Drawing Sheets

(56) References Cited

U.S. PATENT DOCUMENTS

| | | | |
|---|---|---|---|
| 2009/0292223 | A1 | 11/2009 | Sugio et al. |
| 2010/0204608 | A1 | 8/2010 | Sugio et al. |

FOREIGN PATENT DOCUMENTS

| | | |
|---|---|---|
| JP | 05-19155 | 1/1993 |
| JP | 05-100149 | 4/1993 |
| JP | 05-130477 | 5/1993 |
| JP | 05-317260 | 12/1993 |
| JP | 07-151950 | 6/1995 |
| JP | 2934716 | 8/1999 |
| JP | 2001-281520 | 10/2001 |
| JP | 2005-252732 | 9/2005 |
| JP | 2005-252736 | 9/2005 |
| JP | 2005-303842 | 10/2005 |
| JP | 2009-187441 | 8/2009 |
| JP | 2010-61452 | 3/2010 |
| WO | 2007/094219 A1 | 8/2007 |
| WO | 2009/142008 A1 | 11/2009 |

\* cited by examiner

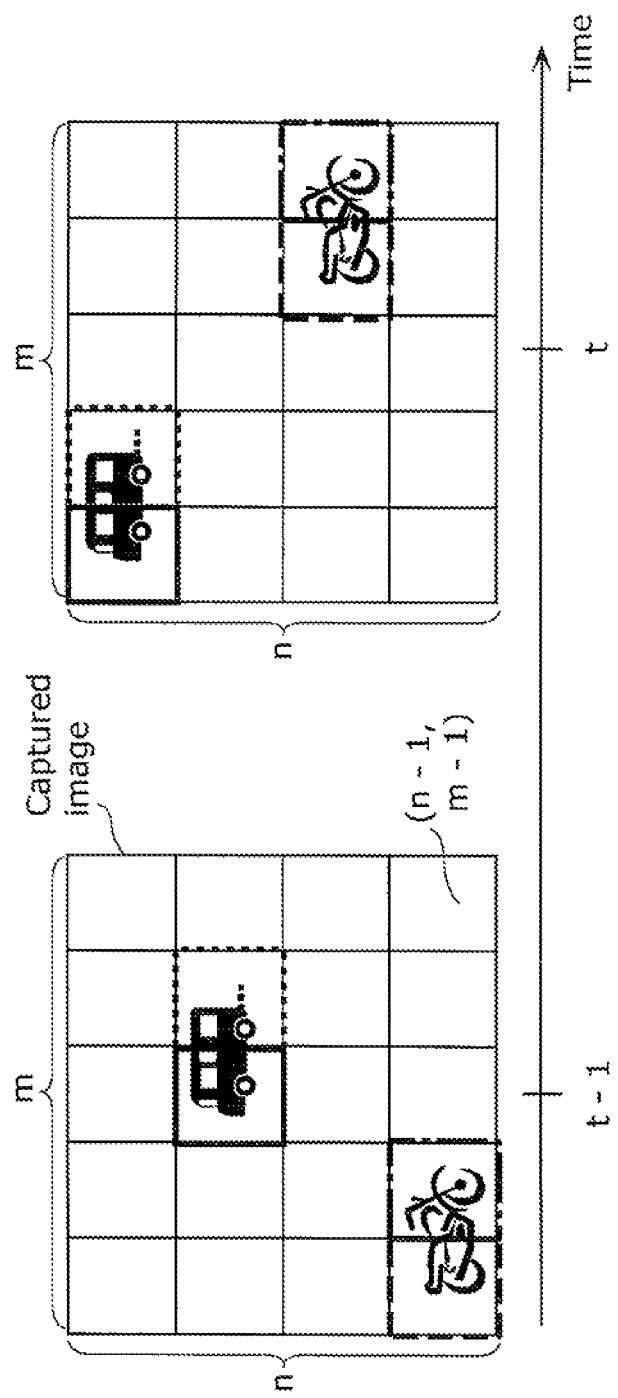

Result of motion detection at time t

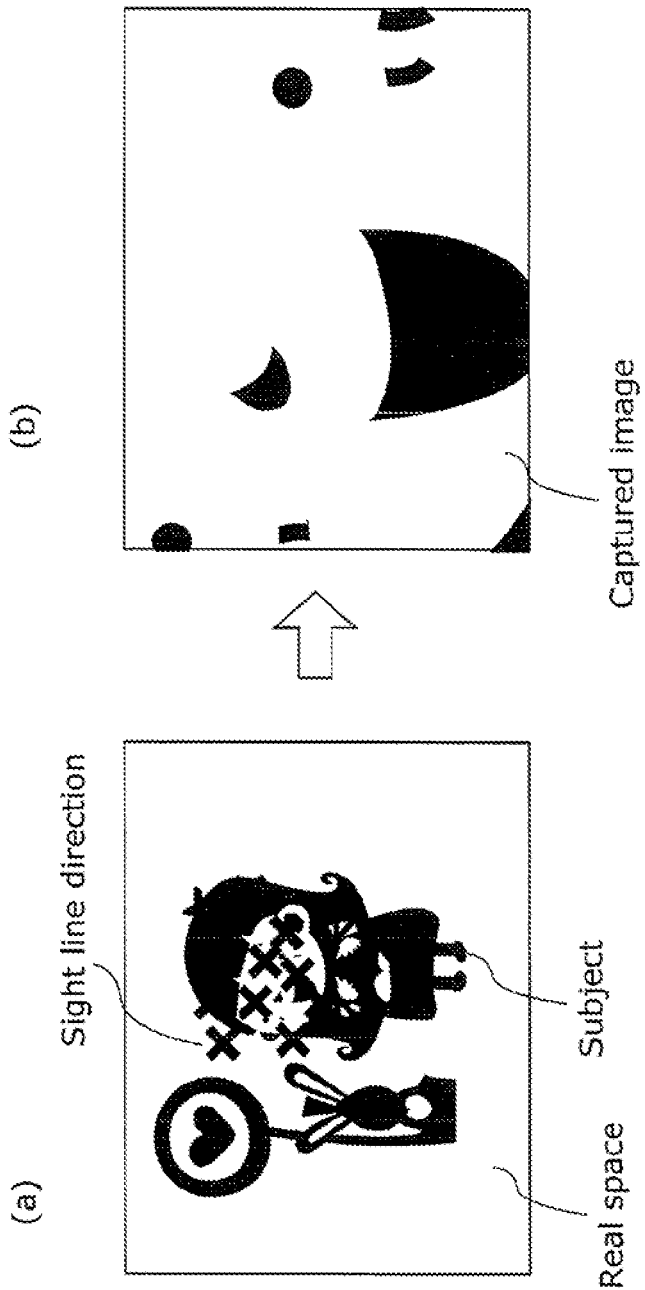

IMAGING APPARATUS AND IMAGING METHOD

BACKGROUND OF THE INVENTION (1) Field of the Invention

The present invention relates to imaging apparatuses to be worn on the head of a user and imaging methods performed by the imaging apparatuses.

(2) Description of the Related Art

Conventionally, an imaging apparatus to be worn on the head of a user (hereafter called "a head-mounted imaging apparatus") has been proposed (see Patent Reference 1 (Japanese Unexamined Patent Application Publication No. 2005-252732), for example). According to the head-mounted imaging apparatus in Patent Reference 1, a user can become hands-free and can capture an image of a subject while doing other tasks without being conscious of an image capturing operation. Furthermore, the head-mounted imaging apparatus in Patent Reference 1 enables the user to perform an editing process reflecting intention of the user by cutting a captured image, correcting blur, or performing electronic zooming based on a sight line direction of the user and head motion of the user.

Moreover, another head-mounted imaging apparatus for performing zooming reflecting intention of the user has also been proposed (see Patent Reference 2 (Japanese Patent No. 2934716), for example). Here, a conventional head-mounted imaging apparatus as disclosed in Patent Reference 2 will be described with reference to FIG. 15.

FIG. 15 is a diagram showing an example of an image capturing screen displayed in a finder of the conventional head-mounted imaging apparatus. This head-mounted imaging apparatus detects sight line positions of a user against the image capturing screen. The head-mounted imaging apparatus starts zooming in toward a telephoto side when a distribution of sight line positions is concentrated on a telephoto region of the image capturing screen or a central region of the image capturing screen. Meanwhile, the head-mounted imaging apparatus starts zooming out toward the wide angle side when the distribution of the sight line positions, as shown in FIG. 15, is concentrated on a wide angle region or a peripheral region. This enables the user to start or finish zooming while watching the image capturing screen in the finder.

SUMMARY OF THE INVENTION

Unfortunately, the above mentioned conventional technique has problems described as follows.

The head-mounted imaging apparatus in Patent Reference 1 can determine the timing of when to start electronic zooming, but cannot determine a specific angle of view during the electronic zooming. For example, in the case where an image of a subject illustrated in (a) of FIG. 16 is being captured, the head-mounted imaging apparatus in Patent Reference 1 starts zooming in the subject after judging that a fluctuation of sight line positions stays at or below a constant value within a predetermined time. However, the head-mounted imaging apparatus in Patent Reference 1, as illustrated in (b) of FIG. 16, for example, may not be able to stop zooming at an appropriate angle of view and can capture an image of a subject magnified excessively.

Moreover, the head-mounted imaging apparatus in Patent Reference 2 can also determine the timing of when to start or finish zooming, but cannot appropriately determine the angle of view. For example, the user can lead the head-mounted imaging apparatus to start zooming out by consciously watching an edge region in a finder. Then, the user can lead the head-mounted imaging apparatus to finish zooming out by stopping watching the edge region in the finder.

In other words, in the head-mounted imaging apparatus in Patent Reference 2, the user is required to watch a region against the wishes of the user in order to operate a camera, and cannot watch the subject whose image is to be captured. As a result, the head-mounted imaging apparatus gives the user consciousness of operating the camera, thus providing a possibility of disadvantaging the head-mounted imaging apparatus. Moreover, the head-mounted imaging apparatus in Patent Reference 2 is required to include the finder and makes the apparatus structure complicated.

Therefore, the present invention has been devised in view of the above-mentioned problems, and has an object to provide an imaging apparatus capable of appropriately determining a zoom angle of view and a method of capturing images in the case where the imaging apparatus is worn on the head of the user.

In order to attain the object, the imaging apparatus according to an aspect of the present invention is an imaging apparatus to be worn on the head of a user, and includes a sight line direction detection unit which detects a sight line direction of the user, a zoom angle determination unit which determines a zoom angle of view such that the zoom angle of view becomes smaller as the variations in the sight line direction decrease, and an imaging unit which captures an image of a subject according to the zoom angle of view.

With this structure, the imaging apparatus can determine a zoom angle of view such that the zoom angle of view becomes smaller as variations in a sight line direction of a user decrease. In other words, the imaging apparatus enables the user to appropriately determine the zoom angle of view which corresponds a region watched by the user. Moreover, the user is not required to change the sight line direction in order only to determine the zoom angle of view. Therefore, the imaging apparatus enables the user to capture an image of the subject watched by the user without consciousness of an image capturing operation. Moreover, the imaging apparatus is not required to include a finder in order to determine a zoom angle of view, enabling the apparatus structure to be simplified.

Moreover, it is preferable that the imaging apparatus further include a shooting parameter obtainment unit which obtains a shooting parameter indicating a state of at least one of the user and the subject at a time of image capturing, and the zoom angle determination unit determine the zoom angle of view based on the shooting parameter and the variations in the sight line direction.

With this structure, the imaging apparatus can more appropriately determine a zoom angle of view because the imaging apparatus can determine the zoom angle of view based on not only the variations in the sight line direction but also the shooting parameter.

Moreover, it is preferable that the shooting parameter obtainment unit have a body motion detection unit which detects, as the shooting parameter, an amount of body motion indicating an amount of motion of the head of the user, and the zoom angle determination unit determine the zoom angle of view such that the zoom angle of view with respect to the variations in the sight line direction becomes larger as the amount of body motion increases.

With this structure, the imaging apparatus can determine a zoom angle of view such that the zoom angle of view with respect to the variations in the sight line direction becomes larger as the amount of body motion increases. Therefore, the imaging apparatus can reduce blur in a captured image and can stabilize the image quality of the captured image.

Moreover, it is preferable that the shooting parameter obtainment unit include a distance measurement unit which measures, as the shooting parameter, distance information indicating a distance to the subject, and the zoom angle determination unit determine the zoom angle of view such that the zoom angle of view with respect to the variations in the sight line direction becomes larger as the distance to the subject increases, the distance being obtained from the distance information.

With this structure, the imaging apparatus can determine a zoom angle of view such that the zoom angle of view with respect to the variations in the sight line direction become larger as the distance to the subject increases. Therefore, in the case where a user is watching a subject in a distance, the imaging apparatus can withhold the zoom angle of view from being extremely small and can withhold an image of the subject excessively zoomed in from being captured.

Moreover, it is preferable that the shooting parameter obtainment unit include a motion detection unit which detects, as the shooting parameter, motion information indicating motion of the subject, and the zoom angle determination unit determine the zoom angle of view such that the zoom angle of view with respect to the variations in the sight line direction becomes smaller with a higher correlation between the motion of the subject obtained from the motion information and motion of the sight line direction.

With this structure, the imaging apparatus can determine a zoom angle of view such that the zoom angle of view with respect to the variations in the sight line direction becomes smaller with a higher correlation between the motion of the subject and the motion of the sight line direction. Therefore, the imaging apparatus can determine a zoom angle of view such that the zoom angle of view does not become larger even though the variations in the sight line direction increase, in the case where the user pursues the subject.

Moreover, it is preferable that the imaging unit capture an image of the subject positioned in the sight line direction by driving the optical system according to the sight line direction.

With this structure, the imaging apparatus can capture an image of the subject positioned in the sight line direction by driving the optical system according to the sight line direction. In other words, the imaging apparatus can capture an image of the subject watched by the user at the determined zoom angle of view and can capture an image of a region in accordance with intention of the user.

Moreover, it is preferable that the zoom angle determination unit determine the zoom angle of view such that the zoom angle of view with respect to the variations in the sight line direction becomes larger as a value increases, the value indicating a difference between a center of variations in the sight line direction and a direction of an optical axis.

With this structure, the imaging apparatus can determine the zoom angle of view such that the zoom angle of view with respect to the variations in the sight line direction becomes larger as the value increases, the value indicating a difference between the center of the variations in the sight line direction and a direction of the optical axis. Therefore, the imaging apparatus can appropriately determine the zoom angle of view such that an image of the subject watched by a user is captured even though the optical system cannot be driven according to the sight line direction.

Moreover, it is preferable that the variations in the sight line direction be expressed by a standard deviation of the sight line direction within a predetermined time.

With this structure, the variations in the sight line direction are expressed by the standard deviation of the sight line direction within the predetermined time. Therefore, this makes it possible to appropriately express the variations in the sight line direction and to appropriately determine the zoom angle of view.

Moreover, it is preferable that the sight line detection unit detect the sight line direction based on an eye electric potential of the user.

With this structure, the imaging apparatus can detect the sight line direction based on the eye electric potential of the user. Therefore, the imaging apparatus can simplify a structure for detecting the sight line direction, enabling the imaging apparatus to be worn on the head of the user without blocking a view of the user.

Moreover, it is preferable that the imaging apparatus, furthermore, include an eyeball movement parameter obtainment unit which obtains an eyeball movement parameter indicating a feature of an eyeball movement of the user based on a temporal change in the sight line direction, and the zoom angle determination unit determine the zoom angle of view based on the eyeball movement parameter and the variations in the sight line direction.

With this structure, the imaging apparatus can determine the zoom angle of view based on not only the variations in the sight line direction but also the eyeball movement parameter, thus enabling the imaging apparatus to more appropriately determine the zoom angle of view.

Moreover, it is preferable that the eyeball movement parameter obtainment unit include a saccade detection unit which detects, as the eyeball movement parameter, a frequency of saccades within a predetermined time based on the temporal change in the sight line direction, and the zoom angle determination unit determine the zoom angle of view such that the zoom angle of view with respect to the variations in the sight line direction becomes larger as the frequency of the saccades increases.

With this structure, the imaging apparatus can determine the zoom angle of view such that the zoom angle of view with respect to the variations in the sight line direction becomes larger as the frequency of the saccades increases. Generally, in the case where saccades occur frequently, a person is unlikely to watch a specific subject. In other words, the imaging apparatus can withhold the user from capturing an image of the subject excessively zoomed in, when the user is not watching the subject.

Moreover, it is preferable that the eyeball movement parameter obtainment unit include a pursuit detection unit which detects, as the eye ball movement parameter, a frequency of pursuits within a predetermined time based on the temporal change in the sight line direction, and the zoom angle determination unit determine the zoom angle of view such that the zoom angle of view with respect to the variations in the slight line directions becomes smaller as the frequency of the pursuits increases.

With this structure, the imaging apparatus can determine the zoom angle of view such that the zoom angle of view with respect to the variations in the sight line direction becomes smaller as the frequency of pursuits increases. Therefore, in the case where a sight line direction of a user pursue motion of a subject, the imaging apparatus can appropriately determine the zoom angle of view such that the zoom angle of view does not become larger even though the variations in the sight line direction increase.

Moreover, the sight line detection unit and the zoom angle determination unit may be configured as an integrated circuit.

It is noted that the present invention can be realized not only as such an imaging apparatus but also as an imaging method of having steps corresponding to operations performed by unique structure elements of the imaging apparatus. Moreover, the present invention can be realized as a program causing a computer to execute each of the steps of this imaging method. Then, as a matter of course, such a program can be distributed via a non-transitory recording medium such as CD-ROM (Compact Disc Read Only Memory) or a transmission medium such as the Internet.

FURTHER INFORMATION ABOUT TECHNICAL BACKGROUND TO THIS APPLICATION

The disclosure of Japanese Patent Application No. 2010-184600 filed on Aug. 20, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4A is a diagram showing an example of how motion information is detected by a motion detection unit according to Embodiment 1 of the present invention;

FIG. 16 is a diagram illustrating an example of a zooming operation of the conventional imaging apparatus.

DETAILED DESCRIPTION OF THE INVENTION

Hereafter, embodiments of the present invention shall be described with reference to the drawings. It is noted that all embodiments described hereafter are illustrated as a preferred example of the present invention. In other words, a value, a form, a material, a component, a component position and a connection configuration, a step, a flow of steps, and the like indicated in the embodiments hereafter are an example of the present invention, but are not intended to limit the present invention. The present invention is limited by a description of the scope of claims. Therefore, among the components according to the following embodiments, a component, which is not referred to in an independent claim illustrating the highest concept of the present invention, is not necessarily required to achieve the object of the present invention, but will be described as a component constituting a more preferable embodiment.

Embodiment 1

Figure 1:
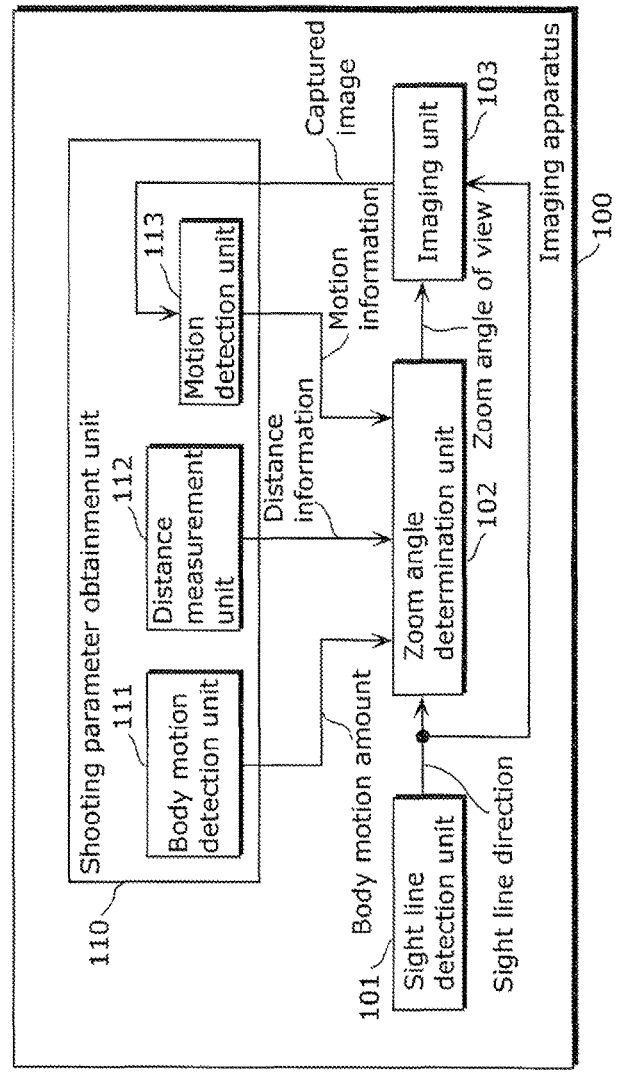
FIG. 1 is a block diagram showing a structure of an imaging apparatus according to Embodiment 1 of the present invention.

FIG. 1 is a block diagram showing a structure of an imaging apparatus 100 according to Embodiment 1 of the present invention. The imaging apparatus 100 shown in FIG. 1 includes a sight line detection unit 101, a shooting parameter obtainment unit 110, a zoom angle determination unit 102, and an imaging unit 103.

The sight line detection unit 101 detects a sight line direction of a user. Specifically, the sight line detection unit 101, for example, detects a sight line direction of the user by an electrooculography (EOG) method of detecting the sight line direction based on an electric potential between the cornea and the retina, a corneal reflection method of detecting motion of a virtual image created inside the cornea by irradiating spotlight on an eyeball, a scleral reflection method of using a difference between a corneal reflectance and a scleral reflectance, and a method using a contact lens, or the like. In Embodiment, the case where the sight line detection unit 101 detects the sight line direction of the user with use of the EOG method will be cited as an example.

The EOG method is a method of detecting sight lines by using a phenomenon that the human cornea is positively charged relative to the retina.

Specifically, the sight line direction is detected by a fluctuation of an electric potential measured by at least one electrode attached near to a human eyeball.

Figure 2:
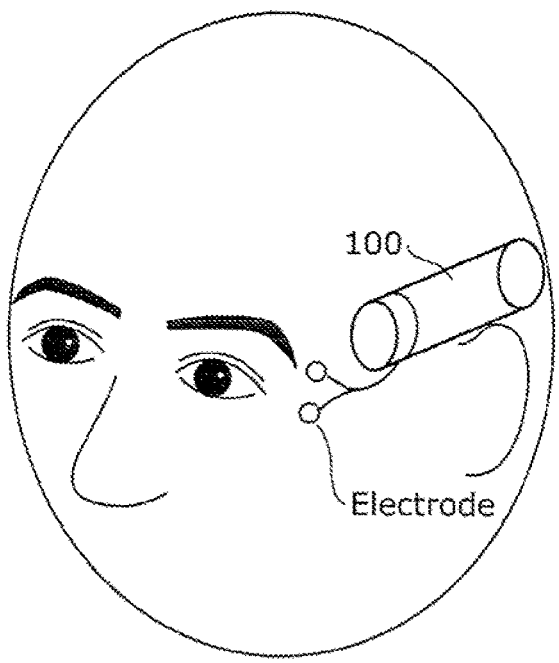
FIG. 2 is a diagram illustrating an example of a situation in which the imaging apparatus according to Embodiment 1 is worn on the head of a user.

A detection of the sight line direction by the sight line detection unit 101 with use of the EOG method enables the user to wear the imaging apparatus 100 on the head, for example, as illustrated in FIG. 2, and enables the user to capture an image of a subject positioned in the sight line direction without blocking the view of the user. In other words, the imaging apparatus 100 can simplify a structure to detect the sight line direction and enables the user to wear the imaging apparatus 100 on the head without blocking the view of the user.

The shooting parameter obtainment unit 110 obtains a shooting parameter. A shooting parameter is information of a state of at least one of a user and a subject at the time of image capturing. Specifically, the shooting parameter, for example, is information indicating motion of at least one of the user and the subject. Moreover, for example, the shooting parameter is information indicating a positional relationship between the user and the subject.

According to Embodiment, the shooting parameter includes an amount of body motion indicating an amount of motion of the head of a user, distance information indicating a distance from the imaging apparatus 100 to a subject, and motion information indicating motion of the subject. It is noted that the shooting parameter is not necessarily required to include all pieces of information about the amount of body motion, the distance information and the motion information. For example, the shooting parameter may be information including only one or two of the three pieces of information indicating the amount of body motion, the distance information and the motion information.

As shown in FIG. 1, the shooting parameter obtainment unit 110 includes a body motion detection unit 111, a distance measurement unit 112, and a motion detection unit 113.

The body motion detection unit 111 detects an amount of body motion as a shooting parameter. The amount of body motion indicates an amount of motion of the head of a user. In other words, the amount of body motion indicates the amount of motion of a wearing region of the imaging apparatus 100. In other words, the amount of body motion indicates the amount of the motion of the imaging apparatus 100.

Specifically, the body motion detection unit 111, for example, calculates a square root of the sum of the squares Axyz (=sqrt($Ax^2+Ay^2+Az^2$)) of each output value in directions of axes X, Y, and Z (Ax, Ay, Az), the value obtained from a three-axis acceleration sensor embedded in the imaging apparatus 100. Then, the body motion detection unit 111 outputs the calculated square root of the sum of the squares Axyz as an amount of body motion X0 to the zoom angle determination unit 102.

It is noted that according to Embodiment, the body motion detection unit 111 detects the amount of body motion with use of the three-axis acceleration sensor, but may detect the amount of body motion with use of an angular velocity sensor and the like. In other words, the body motion detection unit 111 may detect the amount of body motion in any which way that the amount of the motion of the head of the user wearing the imaging apparatus 100 can be detected.

Moreover, according to Embodiment, the square root of the sum of the squares Axyz is used as the amount of body motion X0, but any value is acceptable as long as the value indicates an amount of motion of a sum of absolute values, and the like.

Figure 3A:
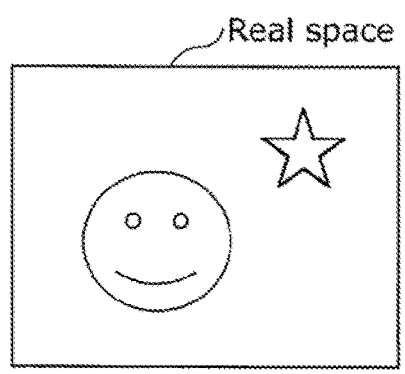
FIG. 3A is a diagram illustrating distance information measured by a distance measurement unit according to Embodiment 1.
Figure 3B:
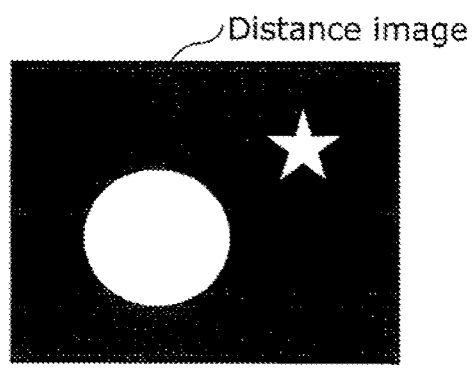
FIG. 3B is a diagram illustrating an example of distance information measured by the distance measurement unit according to Embodiment 1.

The distance measurement unit 112 measures, as a shooting parameter, distance information indicating a distance to a subject. For example, the distance measurement unit 112 uses an infrared ray distance sensor embedded in the imaging apparatus 100 for emitting infrared rays to the subject in FIG. 3A and the like, and produces a distance image like FIG. 3B by receiving light reflected from the subject with a photodiode. The distance image in FIG. 3B shows that a distance becomes shorter as a region becomes brighter and that a distance becomes longer as a region becomes darker. For example, the distance image having an eight-bit gradation shows that a pixel value 0 is most remote and that a pixel value 255 is nearest. Then the distance measurement unit 112 outputs a produced distance image as distance information to the zoom angle determination unit 102.

It is noted that according to Embodiment, the distance measurement unit 112 measures the distance to the subject with the infrared ray distance sensor, and may measure the distance with use of a supersonic distance sensor, and the like. In other words, the distance measurement unit 112 may measure the distance in any which way that the distance from the imaging apparatus 100 to the subject can be measured.

The motion detection unit 113 detects, as a shooting parameter, motion information indicating motion of a subject. For example, the motion detection unit 113 divides a captured image obtained by the imaging unit 103 into n×m blocks (Hereafter, the (n−1)th and the (m−1)th block is described as (n−1, m−1)) and detects a motion vector on a block-by-block basis.

Figure 4B:
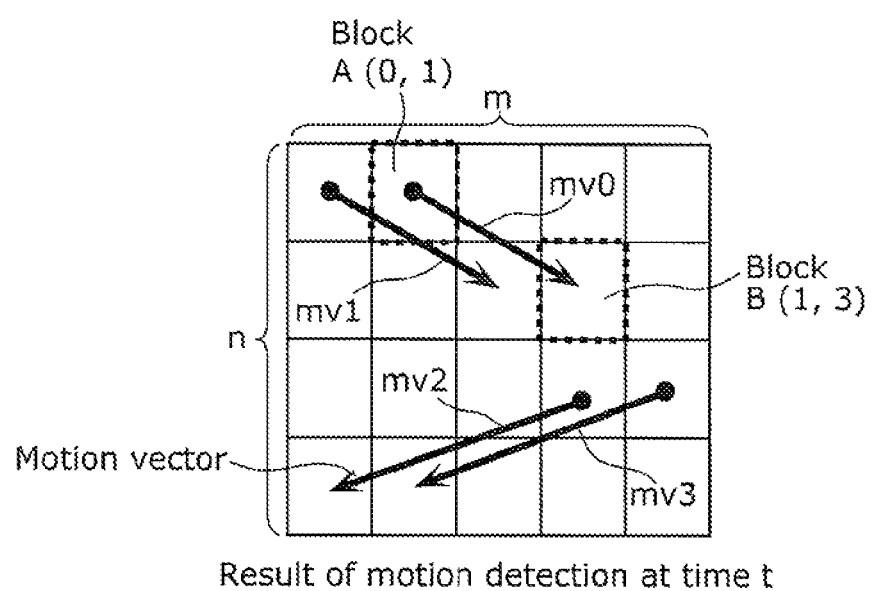
FIG. 4B is a diagram showing an example of motion information detected by the motion detection unit according to Embodiment 1 of the present invention.

A specific example of detecting a motion vector will be described with use of FIG. 4A and FIG. 4B. FIG. 4A illustrates, in (a), a captured image at time t−1 and FIG. 4A illustrates, in (b), a captured image at time t. Here shall be described as an example where the motion vector in the captured image at time t is detected with reference to the captured image at time t−1.

First, the motion detection unit 113 divides the captured image at time t into n×m blocks. Then, the motion detection unit 113 executes matching with the captured image at t−1 for every divided block. Here, the motion detection unit 113 detects a motion vector of every block by specifying the position having the lowest matching cost in the block. Sum of Absolute Difference (SAD) and the like may be used as a matching cost.

A result of a detection of a motion vector in the captured image at time t will be illustrated in FIG. 4B. As illustrated in FIG. 4 B, a motion vector is detected in a region where a moving object exits between time t−1 and time t. The motion detection unit 113 outputs the obtained motion vector of every block as motion information to the zoom angle determination unit 102.

It is noted that according to Embodiment, a method of detecting a motion of the subject by executing block matching is described as an example, but the Lucas-Kanade method and the like may be used for detecting the motion of the subject. Moreover, the captured image at time t−1 is used as a reference image, but the captured image at time before t−1 or the captured image at time after time t may be used as a reference image.

The zoom angle determination unit 102 determines the zoom angle of view based on a shooting parameter and variations in a sight line direction. According to Embodiment, the zoom angle determination unit 102 determines the zoom angle of view with use of a sight line direction detected by the sight line detection unit 101, and an amount of body motion, distance information, and motion information, all obtained by the shooting parameter obtainment unit 110.

Specifically, the zoom angle determination unit 102 determines the zoom angle of view such that the zoom angle of view becomes smaller as variations in a sight line direction decrease. In other words, the zoom angle determination unit 102 determines the zoom angle of view based on the variations in the sight line direction within the predetermined time.

Furthermore, the zoom angle determination unit 102 determines the zoom angle of view such that the zoom angle of view with respect to the variations in the sight line direction becomes larger as the amount of body motion increases. Furthermore, the zoom angle determination unit 102 determines the zoom angle of view such that the zoom angle of view with respect to the variations in the sight line direction becomes larger as a distance to the subject, obtained from the distance information, increases. Moreover, the zoom angle determination unit 102 determines the zoom angle of view such that the zoom angle of view with respect to the variations in the sight line direction becomes smaller with a higher correlation between motion of the subject obtained from motion information and motion of a sight line direction.

The imaging unit 103 captures an image of the subject according to the determined zoom angle of view. According to Embodiment, the imaging unit 103 captures an image of the subject positioned in the sight line direction by driving the optical system (not illustrated) according to the sight line direction. Specifically, the imaging unit 103, for example, drives the optical system embedded in the imaging apparatus 100 such that a direction of an optical axis matches up with the center of variations in a sight line direction and such that an image of a region having the determined zoom angle of view is captured.

It is noted that the optical system is not required to be included in the imaging apparatus 100. For example, the optical system may be a structure removable from the imaging apparatus 100.

Hereafter, procedures for the zoom angle determination unit 102 to determine a zoom angle of view will be described with reference to FIG. 5.

Figure 5:
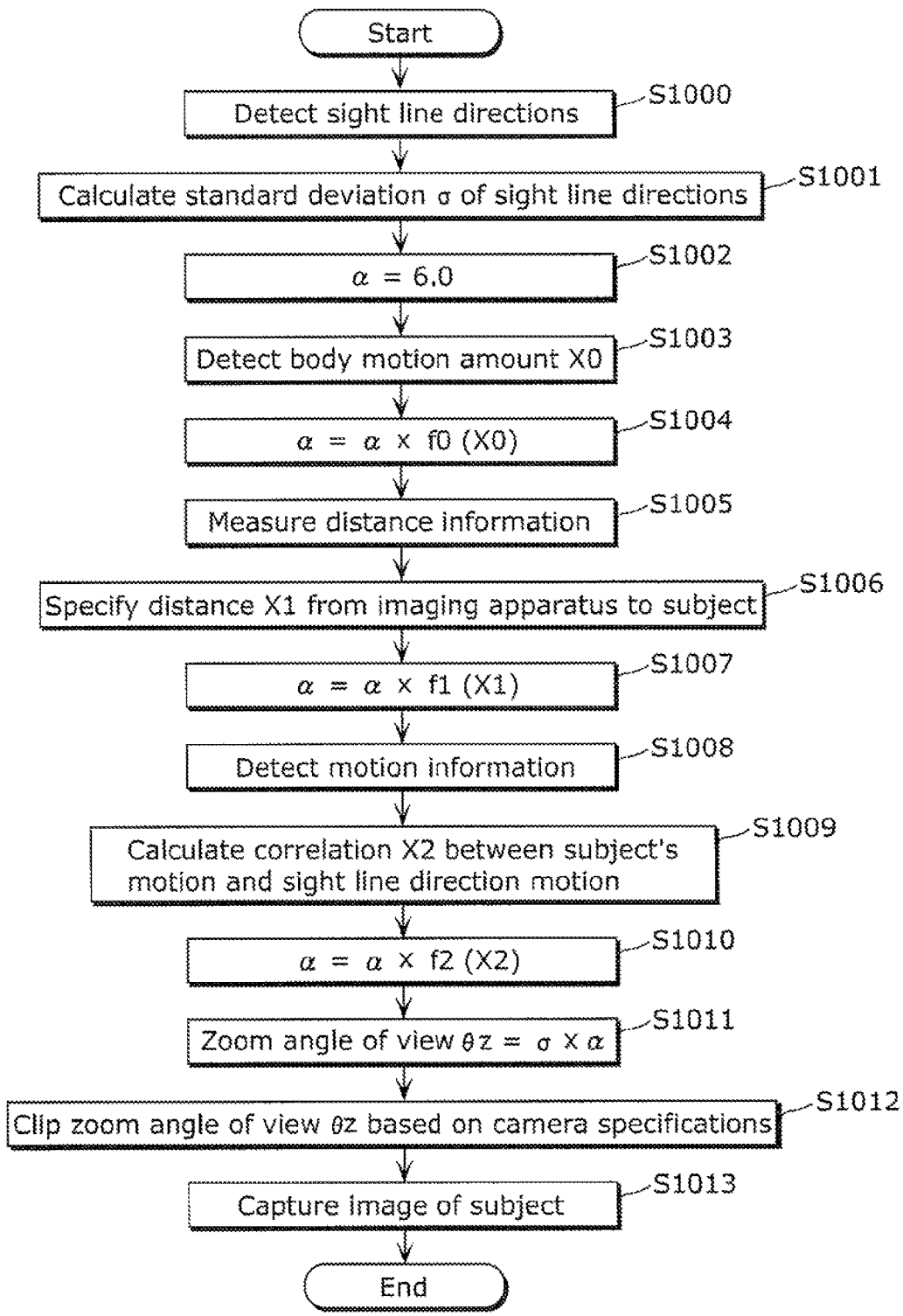
FIG. 5 is a flowchart showing processing operations of the imaging apparatus according to Embodiment 1 of the present invention.

FIG. 5 is a flowchart illustrating processing operations of the imaging apparatus 100 according to Embodiment 1 of the present invention.

First, the sight line detection unit 101 detects a sight line direction of a user (S1000). Specifically, the sight line detection unit 101 sequentially detects the sight line direction at a predetermined sampling interval, for example.

Here, the sight line direction is expressed by an angle against a direction of an optical axis. It is noted that the sight line direction is not necessarily required to be expressed by the angle against a direction of the optical axis and may be expressed by a vector or coordinates on the captured image.

The zoom angle determination unit 102 calculates a standard deviation σ of a sight line direction within a predetermined time as a value indicating variations in a sight line direction (S1001). The predetermined time, for example, may be time required to detect a certain number or more of sight line directions.

Then, the zoom angle determination unit 102 sets the parameter value α at an initial value 6.0 (S1002). It is noted that a processing operation of this step S1002 is not necessarily required to be performed. For example, the initial value of the parameter value α may be set in advance.

This parameter value α is a value which determines a zoom angle of view θz. According to Embodiment, the parameter value α is used for determining the zoom angle of view θz as follows (Expression 1). In other words, according to Embodiment, the zoom angle of view θz becomes larger as parameter value α increases.

$$\theta z = \sigma \times \alpha \quad \text{(Expression 1)}$$

Here, the initial value of the parameter value α will be described in detail.

Generally, a person tends to watch a contour part of an object and an inner part of the object in the case where the person recognizes the object. Therefore, a solution of a standard deviation of a sight line direction within a predetermined time leads to a solution of the angle of view watched by the user.

Here, according to Embodiment, the zoom angle determination unit 201 sets the initial value of the parameter value α at 6.0. In other words, in the case where the parameter value α is the initial value, the zoom angle determination unit 102 determines, as the zoom angle of view, an angle of view which is a little larger than the standard deviation σ of the sight line direction. Such a way of setting the initial value of the parameter value α enables the imaging apparatus 100 to decrease a proportion of a watched object (i.e. the subject) in a captured image.

Figure 6A:
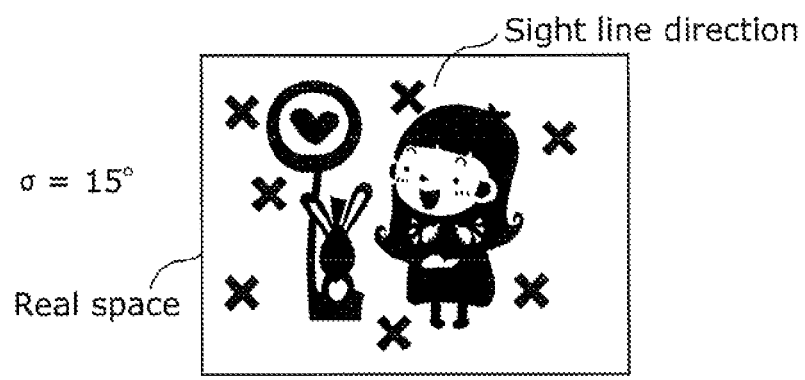
FIG. 6A is a diagram illustrating a relationship between a zoom angle of view and a standard deviation of a sight line direction, both determined by a zoom angle determination unit according to Embodiment 1 of the present invention.
Figure 6B:
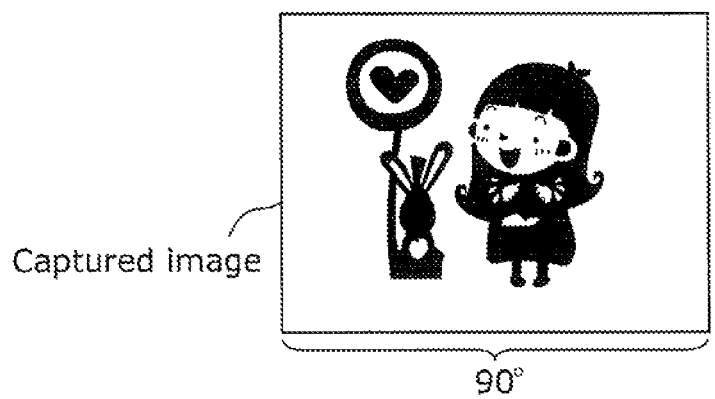
FIG. 6B is a diagram illustrating the relationship between the zoom angle of view and the standard deviation of the sight line direction, both determined by the zoom angle determination unit according to Embodiment 1 of the present invention.

For example, as illustrated in FIG. 6A, in the case where the parameter value α is the initial value 6.0, when the standard deviation σ of the sight line direction in a real space is 15°, the zoom angle determination unit 102 determines 90° for the zoom angle of view θz based on (Formula 1).

The imaging unit 103 captures an image of the subject according to the determined zoom angle of view θz.

Figure 6C:
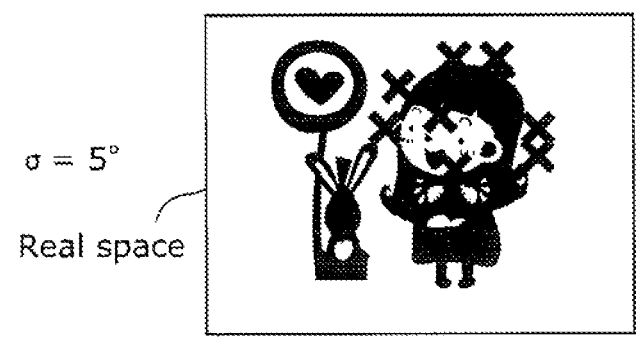
FIG. 6C is a diagram illustrating the relationship between the zoom angle of view and the standard deviation of the sight line direction, both determined by the zoom angle determination unit according to Embodiment 1 of the present invention.
Figure 6D:
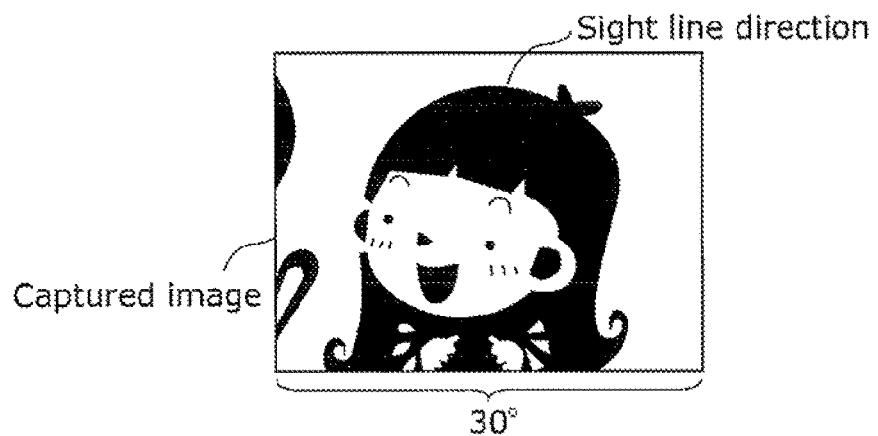
FIG. 6D is a diagram illustrating the relationship between the zoom angle of view and the standard deviation of the sight line direction, both determined by the zoom angle determination unit according to Embodiment 1 of the present invention.

Moreover, for example, as illustrated in FIG. 6C, in the case where the parameter value α is the initial value 6.0, when a standard deviation σ of the sight line direction is as small as 5 degrees, the zoom angle determination unit 102 determines 30 degrees for the zoom angle of view θz based on (Formula 1). The imaging unit 103 captures an image of a region watched by the user, as illustrated in FIG. 6D, according to the determined zoom angle of view θz.

Figure 6E:
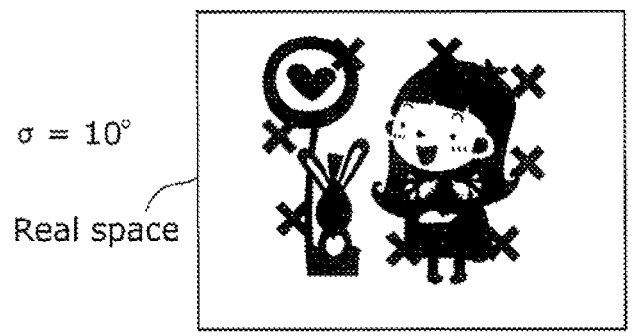
FIG. 6E is a diagram illustrating the relationship between the zoom angle of view and the standard deviation of the sight line direction, both determined by the zoom angle determination unit according to Embodiment 1 of the present invention.
Figure 6F:
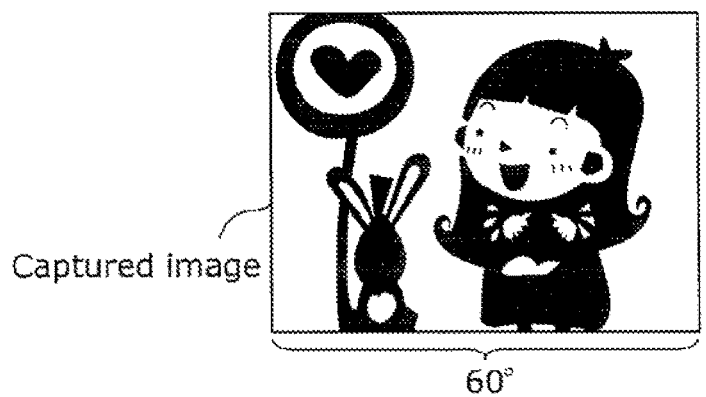
FIG. 6F is a diagram illustrating the relationship between the zoom angle of view and the standard deviation of the sight line direction, both determined by the zoom angle determination unit according to Embodiment 1 of the present invention.

Moreover, for example, as indicated in FIG. 6E, in the case where the parameter value α is the initial value 6.0, when the standard deviation σ of the sight line direction is 10 degrees, becoming a little wider than the standard deviation σ of the sight line direction in FIG. 6C, the zoom angle determination unit 102 accordingly determines 60 degrees for the zoom angle of view θz based on (Formula 1). The imaging unit 103, as illustrated in FIG. 6F, captures an image of a region which is a little wider than a region in FIG. 6D according to the determined zoom angle of view θz. As described above, the zoom angle of view is determined based on the standard deviation σ of the sight line direction of the user (Formula 1), and an image of the region watched by the user is captured.

It is noted that according to Embodiment, the initial value of the parameter value α is 6.0, but is not necessarily required to be 6.0. For example, in the case where the user wants to capture an image of a watched object with the image capturing screen filled with the watched object, the initial value of the parameter value α may be set at less than 6.0.

The description will refer back to the flowchart of FIG. 5. Next, the body motion detection unit 111 detects the amount of body motion X0 indicating an amount of motion of the head of the user (S1003).

Figure 7A:
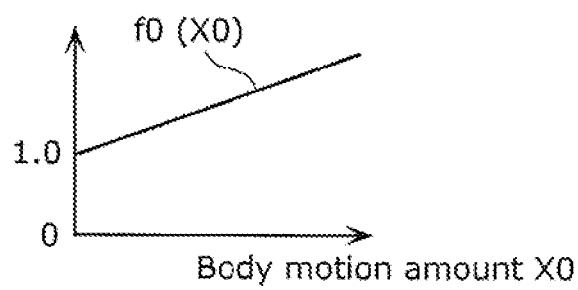
FIG. 7A is a graph plotting an example of a relationship between an amount of body motion and a converted value according to Embodiment 1 of the present invention.

The zoom angle determination unit 102 adjusts the parameter value α with use of the amount of body motion X0 obtained from the body motion detection unit 111 (S1004). Specifically, the zoom angle determination unit 102, for example, updates the parameter value α by multiplying a converted value f0 (X0) determined from the amount of body motion X0, as shown in FIG. 7A, for example, by the parameter value α. In other works, the zoom angle determination unit 102 adjusts the parameter value α such that the parameter value α becomes larger as a value indicating the amount of body motion X0 increases.

This enables the parameter value α to become large in the case where the head motion of the user is large, and enables the zoom angle of view with respect to the standard deviation σ of the sight line direction to become large. In other words, the imaging apparatus 100 operates a zoom lens in a direction of widening an angle of view in the case where the head motion of the user is large. As a result, the imaging apparatus 100 can reduce blur in a captured image and stabilize the image quality of the captured image.

Next, the distance measurement unit 112 measures distance information (S1005). The zoom angle determination unit 102 specifies a distance X1 to the subject positioned in the sight line direction with use of the distance information obtained from the distance measurement unit 112 and the sight line direction obtained from the sight line detection unit 101 (S1006).

Figure 7B:
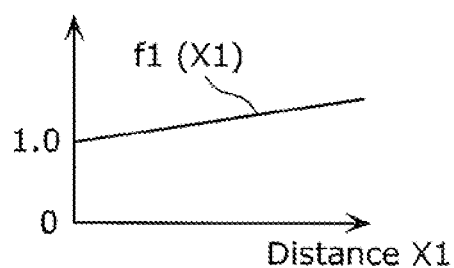
FIG. 7B is a graph plotting an example of the relationship between a distance and a converted value according to Embodiment 1 of the present invention.

Then, the zoom angle determination unit 102 adjusts a parameter value α with use of the distance X1 (S1007). Specifically, the zoom angle determination unit 102, for example, updates the parameter value α by multiplying a converted value f1 (X1) determined by the distance X1 as shown in FIG. 7B, for example, by the parameter value α.

In other words, the zoom angle determination unit 102 adjusts the parameter value α such that the parameter value α becomes larger as a value indicating the distance X1 increases.

This enables the parameter value α to become large, and enables the zoom angle of view θz with respect to the standard deviation σ of the sight line direction to become large, in the case where a distance to the subject watched by the user is large. In other words, the imaging apparatus 100 operates a zoom lens in the direction of widening the angle of view in the case where the distance to the subject is large.

Generally, when a user is watching a subject in a distance, a standard deviation of a sight line direction tends to become extremely small. Therefore, the imaging apparatus 100 can withhold the zoom angle of view from being extremely small and withhold the user from taking an image of a subject excessively zoomed in by extending the zoom angle of view, in the case where the distance to the subject is large.

Next, the motion detection unit 113 detects motion information (S1008).

The zoom angle determination unit 102 specifies motion of a subject positioned in a sight line direction of the user with use of motion information obtained from the motion detection unit 113 and the sight line direction obtained from the sight line detection unit 101. Then, the zoom angle determination unit 102 calculates a motion correlation X2 as a value indicating height of a correlation between motion of a specified subject and motion of a sight line direction of the user (S1009). Specifically, the zoom angle determination unit 102 first determines a motion vector MV (t), which is motion of blocks positioned in the sight line direction of the user, with use of motion information at time t. Then, the zoom angle determination unit 102 determines a vector Eye (t), which is a value indicating an amount of change in the sight line direction of the user from time t−1 to time t. The zoom angle determination unit 102 calculates, as the motion correlation X2, a sum of the squared differences between MV (t) and Eye (t).

It is noted that the zoom angle determination unit 102 calculates, as the motion correlation X2, the sum of the squared differences between MV (t) and Eye (t), but is not necessarily required to calculate the sum of the squared differences as the motion correlation X2. The motion correlation X2 is acceptable as long as a value indicates height of a correlation between MV (t) and Eye (t).

Figure 7C:
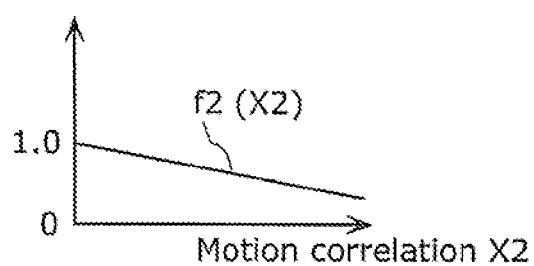
FIG. 7C is a graph plotting an example of a relationship between a motion correlation and a converted value according to Embodiment 1 of the present invention.

The zoom angle determination unit 102 adjusts the parameter value α with use of the motion correlation X2 (S1010). Specifically, the zoom angle determination unit 102, for example, updates the parameter value α by multiplying a converted value f2 (X2) determined by the motion, correlation X2, as illustrated in FIG. 7C, for example, by the parameter value α. In other words, the zoom angle determination unit 102 adjusts the parameter value α such that the parameter value α becomes smaller as the motion correlation X2 becomes larger.

This leads the parameter value α to decrease with a higher correlation between the motion of the subject watched by the user and the motion of sight lines of the user, while leads the zoom angle of view θz with respect to the standard deviation σ of the sight line direction to become small. In other words, the imaging apparatus 100 can determine the zoom angle of view such that the zoom angle of view does not become large even though the standard deviation of the sight line direction becomes large, in the case where the user pursues the subject.

Next, the zoom angle determination unit 102 determines, based on (Expression 1), the zoom angle of view θz with use of an adjusted parameter value α (S1011). Then, the zoom angle determination unit 102 clips the zoom angle of view θz in accordance with camera specifications of the imaging unit 103 (S1012). Specifically, the zoom angle determination unit 102 clips the zoom angle of view θz to a range of θMin to θMax that are image caputurable angles of view of the imaging unit 103.

For example, in the case where the zoom angle of view θz is larger than the zoom angle of view θMax, the zoom angle determination unit 102 updates the zoom angle of view θz such that the zoom angle of view is Max. Moreover, for example, in the case where the zoom angle of view θz is smaller than the zoom angle of view θMin, the zoom angle determination unit 102 updates the zoom angle of view θz such that the zoom angle of view is Min.

It is noted that a processing operation of this step S1011 is not necessarily required to be performed. For example, in the case where the zoom angle of view θz ranges from Min or more to Max or less, the zoom angle determination unit 102 is not required to clip the zoom angle of view θz.

Finally, the imaging unit 103 captures an image of the subject according to the determined zoom angle of view θz (S1013). According to Embodiment, the imaging unit 103 captures an image of a region watched by the user, with use of the sight line direction obtained from the sight line detection unit 101 and the zoom angle of view θz obtained from the zoom angle determination unit 102.

Specifically, the imaging unit 103 captures an image of the subject positioned in the sight line direction by driving the optical system according to the sight line direction. For example, the imaging unit 103 provides pan and tilt control to a lens barrel such that a direction of an optical axis coincides with an average of sight line directions. In other words, the imaging unit 103 captures an image such that the average of sight line directions is the center of the image. Furthermore, the imaging unit 103 drives the zoom lens in a telephoto direction or a wide angle direction such that an image of a region corresponding to the zoom angle of view θz is captured.

Figure 8A:
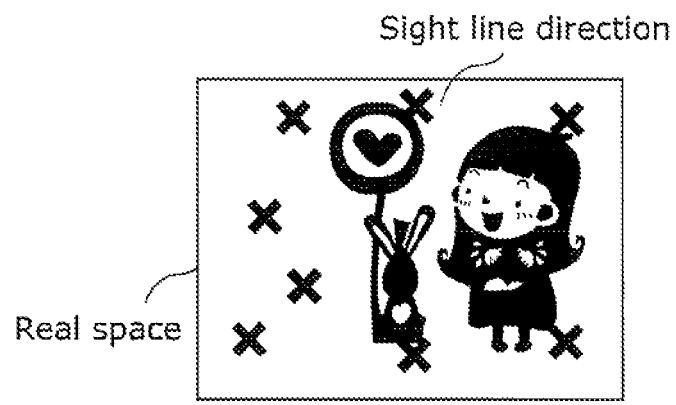
FIG. 8A is a diagram illustrating an example of an operation of an imaging unit according to Embodiment 1 of the present invention.
Figure 8A:
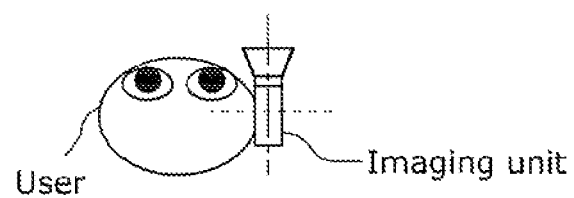
Figure 8B:
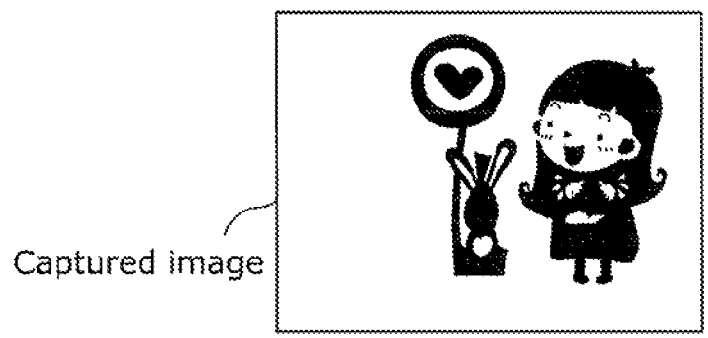
FIG. 8B is a diagram illustrating an example of an image captured by the imaging unit according to Embodiment 1 of the present invention.
Figure 8C:
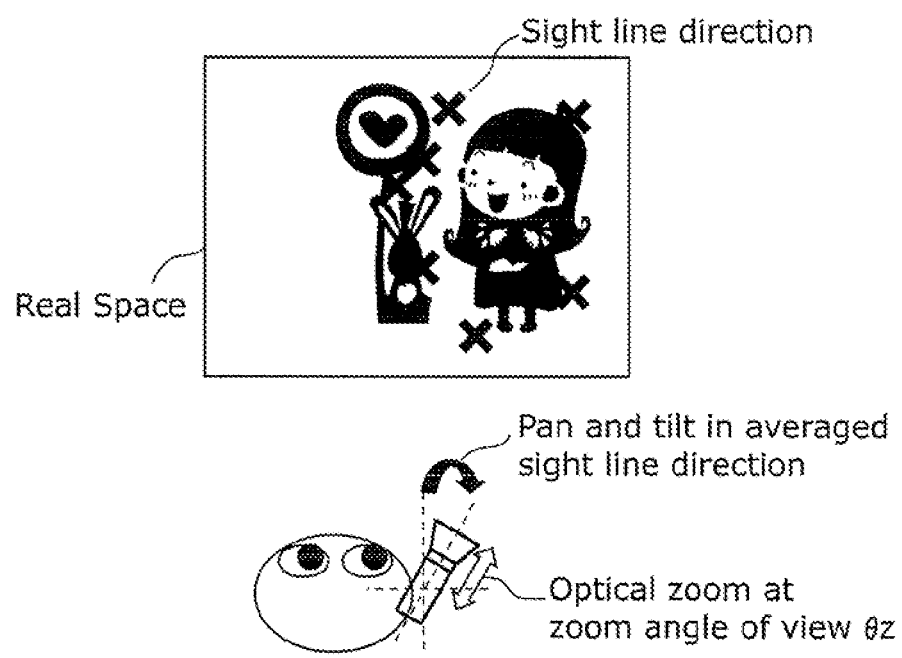
FIG. 8C is a diagram illustrating an example of an operation of the imaging unit according to Embodiment 1 of the present invention.

A specific example of an operation of the imaging unit 103 will be described with use of FIGS. 8A to 8D. The imaging unit 103 captures a wide angle image, as shown in FIG. 8B, in the case where a sight line direction in a real space of the user, as shown in FIG. 8A, for example, spread largely in a direction of an optical axis.

Figure 8D:
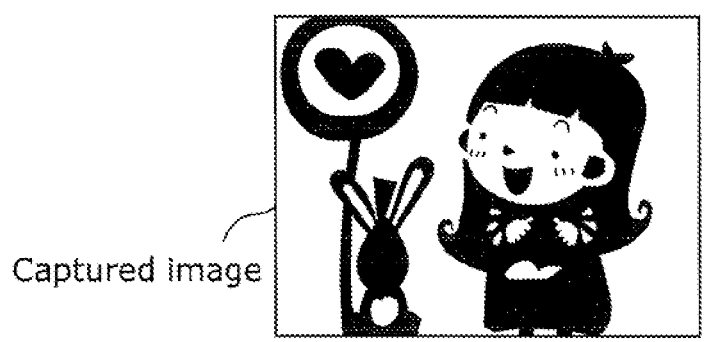
FIG. 8D is a diagram illustrating an example of an image captured by the imaging unit according to Embodiment 1 of the present invention.

Meanwhile, in the case where the sight line directions are distributed to a direction different from the direction of the optical axis, the imaging unit 103 provides a pan and tilt control to the lens barrel such that the direction of the optical axis coincides with the average of the sight line directions. Furthermore, the imaging unit 103 captures an image of a region watched by the user by performing optical zoom in accordance with the zoom angle of view θz obtained from the zoom angle determination unit 102 (FIG. 8D).

With the above mentioned procedures, the imaging apparatus 100 determines the zoom angle of view θz based on the variations in the sight line direction of the user and the shooting parameter, and then captures an image of the subject according to the determined zoom angle of view θz.

It is noted that according to Embodiment, the zoom angle determination unit 102 adjusts the parameter value α with use of the amount of body motion X0, the distance X1, and the motion correlation X2, but may use a part of the three values for adjusting the parameter value α.

Moreover, according to Embodiment, converted values f0 (X0) to f2 (X2), which linearly change from respective input values, as shown in FIGS. 7A to 7C, are used for adjusting the parameter value α, but converted values, which nonlinearly change from respective input values, may be used.

It is noted that according to Embodiment, the imaging unit 103 captures an image of the subject positioned in a direction watched by the user by providing a pan and tilt control to the lens barrel and further performing optical zoom. However, the imaging unit 103 may capture an image of the subject positioned in the direction watched by the user by performing electronic zoom in order to miniaturize the imaging apparatus 100 and decrease power consumption of the imaging apparatus 100. Specifically, the imaging unit 103 may capture an image of the subject by capturing, from the image obtained from the image sensor, a region which is located at the zoom angle of view θz and has the average of slight line directions as the center. Moreover, the imaging unit 103 captures an image such that the average of the sight line directions is the center of the image, in order to remove an influence of noise and the like or stabilize the captured image, but may capture an image such that the mode value or the median value of a sight line direction within a predetermined time, or the sight line direction just detected is the center of the image.

According to Embodiment 1 described above, the imaging apparatus 100 can accurately determine the zoom angle of view according to a standard deviation of the sight line direction of the user. Moreover, the imaging apparatus 100 can capture an image in the direction watched by the user according to the average of the sight line directions. As a result, the imaging apparatus 100 can perform framing in accordance with the intention of the user even though the head-mounted imaging apparatus does not include a finder.

In other words, the imaging apparatus 100 can determine the zoom angle of view such that the zoom angle of view becomes smaller as the variations in the sight line direction of the user decrease. The imaging apparatus 100 enables the user to appropriately determine the zoom angle of view adapted to a region watched by the user. Moreover, the user is not required to change the sight line direction in order only to determine the zoom angle of view. Therefore, the imaging apparatus 100 can capture an image of the subject watched by the user without making the user aware of an image capturing operation. Moreover, the imaging apparatus 100 is not required to have a finder to determine the zoom angle of view, simplifying a structure of the apparatus.

Furthermore, the imaging apparatus 100 can capture an image of the subject positioned in the sight line direction by driving the optical system according to the sight line direction. In other words, the imaging apparatus 100 can capture an image of the subject watched by the user at the determined zoom angle of view and can capture an image of the region in accordance with the intention of the user.

It is noted that according to Embodiment, the body motion detection unit 111 detects the amount of body motion of the user with use of information from a sensor such as an acceleration sensor, but, for example, may detect the amount of body motion with use of motion information outputted from the motion detection unit 113. Specifically, the body motion detection unit 111 may detect, as the amount of body motion X0, the size of the average vector of motion vectors in all blocks included in the motion information. This enables the imaging apparatus 100 to dispense with a body motion detection sensor such as an acceleration sensor, leading to miniaturization and a decrease in power consumption.

Moreover, according to Embodiment, the zoom angle determination unit 102 specifies the distance X1 from the imaging apparatus 100 to the subject positioned in the sight line direction of the user with use of distance information obtained from the distance measurement unit 112. However, the zoom angle determination unit 102, for example, may specify the distance X1 with use of a convergence angle obtained from left and right sight line directions of the user detected by the sight line detection unit 101. Moreover, the zoom angle determination unit 102 may estimate distance information from a captured image obtained from the imaging unit 103. This enables the imaging apparatus 100 to dispense with a distance measurement sensor such as an infrared ray distance sensor, leading to miniaturization and a decrease in power consumption.

Moreover, according to Embodiment, the motion detection unit 113 detects motion information of the subject with use of a captured image obtained from the imaging unit 103. However, the motion detection unit 113, for example, may acquire motion information by receiving positional information from a positional information sensor embedded in advance in a subject candidate that the user wants to watch. This enables the motion detection unit 113 to skip a block matching processing and the like for detecting a motion vector, leading to a decrease in an amount of throughput.

Embodiment 2

Hereafter, Embodiment 2 of the present invention will be described.

According to Embodiment 2, an imaging apparatus includes an imaging unit that enables a user to control only optical zoom. Moreover, a processing content of a zoom angle determination unit in Embodiment 2 is different from the processing content of a zoom angle determination unit in Embodiment 1. Hereafter, the imaging apparatus according to Embodiment will be described with reference to drawings, with differences from Embodiment 1 focused on.

Figure 9:
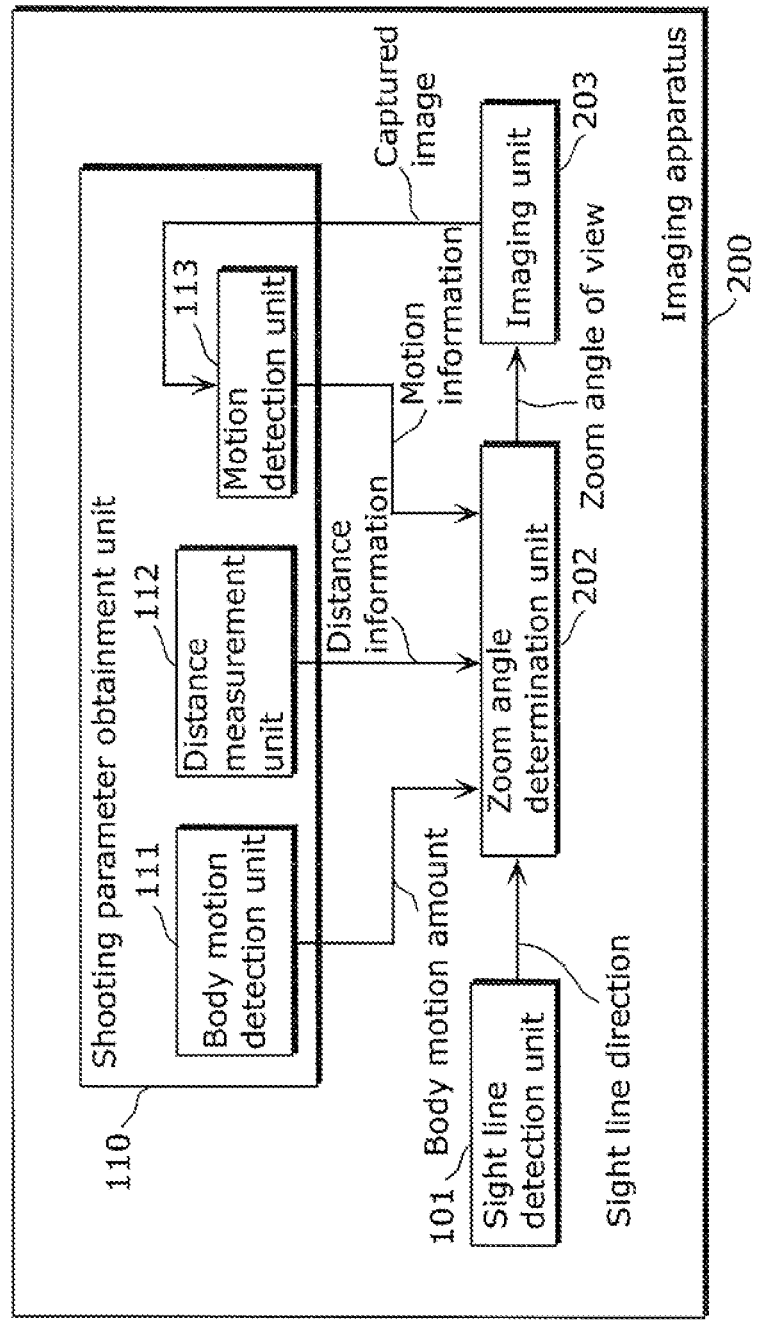
FIG. 9 is a block diagram showing a structure of an imaging apparatus according to Embodiment 2 of the present invention.

FIG. 9 is a block diagram showing a structure of an imaging apparatus 200 according to Embodiment 2 of the present invention. It is noted that the components similar to FIG. 1 are already illustrated in FIG. 9, and description will be omitted with the same reference numerals attached.

The imaging apparatus 200 according to Embodiment includes the sight line detection unit 101, the shooting parameter obtainment unit 110, a zoom angle determination unit 202, and an imaging unit 203.

The zoom angle determination unit 202 determines a zoom angle of view with use of variations in a sight line direction detected by the sight line detection unit 101, and a shooting parameter (i.e. an amount of body motion, distance information, and motion information) obtained by the shooting parameter obtainment unit 110. At this time, the zoom angle determination unit 202 determines the zoom angle of view such that the zoom angle of view with respect to variations in a sight line direction becomes larger as a difference increases between a center of the variations in the sight line direction and a direction of an optical axis.

The imaging unit 203 captures an image of a subject according to the determined zoom angle of view. Specifically, the imaging unit 103, for example, controls the optical system such that an image of a region of the determined zoom angle of view is captured. It is noted that according to Embodiment, the imaging unit 201 does not provide pan and tilt control.

Next, each of the operations of the imaging apparatus 200 configured as mentioned above will be described.

Figure 10:
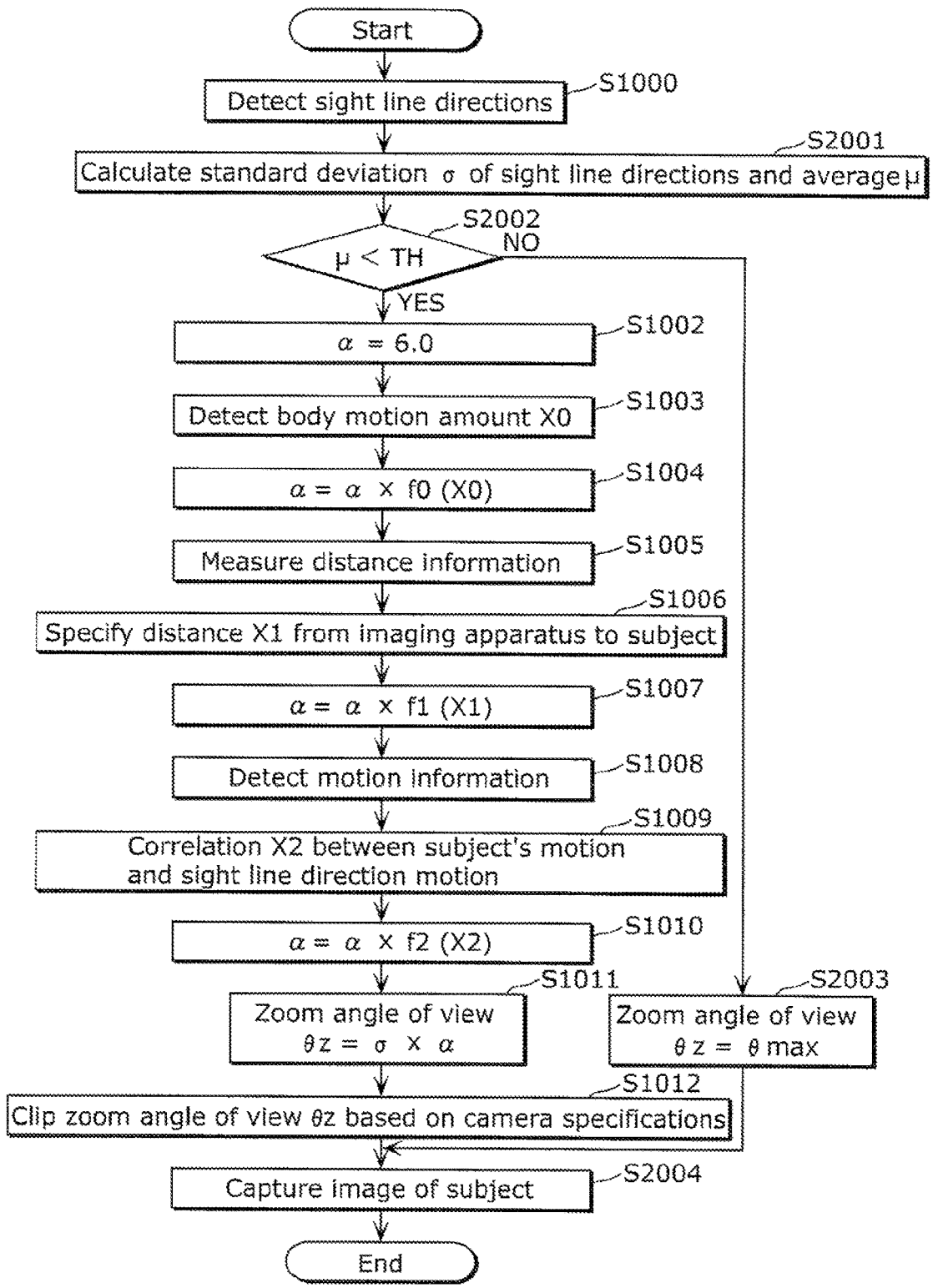
FIG. 10 is a flowchart showing processing operations of the imaging apparatus according to Embodiment 2 of the present invention.

FIG. 10 is a flowchart illustrating processing operations of the imaging apparatus 200 according to Embodiment 2 of the present invention. It is noted that description about the steps similar to FIG. 5 will be omitted in FIG. 10 with the same reference numerals attached.

The zoom angle determination unit 202 calculates not only a standard deviation σ of a sight line direction detected within a predetermined time but also an average μ of these sight line directions (S2001). Then, the zoom angle determination unit 202 determines whether or not the average μ of these sight line directions is smaller than threshold TH. Here, in the case where the average μ of these sight line directions is smaller than threshold TH (YES in S2002), the processing operations from step S1002 to step S1012 are performed like Embodiment 1, and the zoom angle of view θz is determined.

Meanwhile, in the case where the average μ of the sight line directions is threshold TH or higher (NO in S2002), the zoom angle determination unit 202 determines the zoom angle of view θz for θMax that is the maximum value for the image capturable angle of view of the imaging unit 203. (S2003). In other words, the zoom angle determination unit 202 determines the zoom angle of view such that the zoom angle of view with respect to the variations in the sight line direction becomes larger with a larger difference between the center of the variations in the sight line direction and the direction of the optical axis.

Finally, the imaging unit 203 captures an image of the subject positioned in the direction of the optical axis according to the determined zoom angle of view θz (S2004). Specifically, the imaging unit 203 drives a zoom lens in a telephoto direction or a wide angle direction such that a region corresponding to the zoom angle of view θz is positioned, the region obtained from the zoom angle determination unit 202.

In accordance with the above mentioned procedures, the imaging apparatus 200 determines the zoom angle of view θz based on the variations in the sight line direction of the user and the shooting parameter, and then captures an image of the subject according to the determined zoom angle of view θz.

It is noted that according to Embodiment, the zoom angle determination unit 202 determines the zoom angle of view θz based on whether or not the average μ of the sight line direction is smaller than the threshold TH, but is not necessarily required to determine the zoom angle of view θz in this way. For example, the zoom angle of view determination unit 202 may set the parameter value α such that the parameter value α becomes larger with a larger difference between the average μ of the sight line directions and a direction of an optical axis. This enables the zoom angle determination unit 202 to determine the zoom angle of view θz such that the zoom angle of view θz becomes larger with a larger difference between the average μ of the sight line directions and the direction of the optical axis.

Moreover, the average μ of sight line directions is used as a value indicating the center of the sight line direction, but the mode value or the median value of the sight line direction within a predetermined time may be used.

According to Embodiment 2 as illustrated above, the imaging apparatus 200 can control optical zoom in the case where the sight line direction of the user fail to concentrate on around the direction of the optical axis, while can perform optical zoom according to the standard deviation in the case where the sight line direction of the user concentrate on around the direction of the optical axis. This enables the imaging apparatus 200 to withhold the user from zooming in while giving a sideways glance at the subject even without a mechanism of providing pan and tilt control, and to perform framing in accordance with the intention of the user In other words, the imaging apparatus 200 can determine the zoom angle of view such that the zoom angle of view with respect to the variations in the sight line direction becomes larger as a value increases, the value indicating the difference between the center of the variations in the sight line direction and the direction of the optical axis. Therefore, the imaging apparatus 200 can appropriately determine the zoom angle of view such that an image of the subject watched by the user is captured even though the optical system cannot be driven according to the sight line direction.

Embodiment 3

Next, Embodiment 3 of the present invention will be described. The imaging apparatus according to Embodiment 3 determines a zoom angle of view based on an eyeball movement parameter indicating a feature of an eyeball movement of a user.

Saccade is known as a type of human eyeball movement. The saccade is an eyeball movement for capturing a subject, reflected in peripheral retina having a low resolution, with central fovea having a high resolution. The velocity of saccade is known to be very large, standing at 100 to 500 degrees per second.

Figure 11:
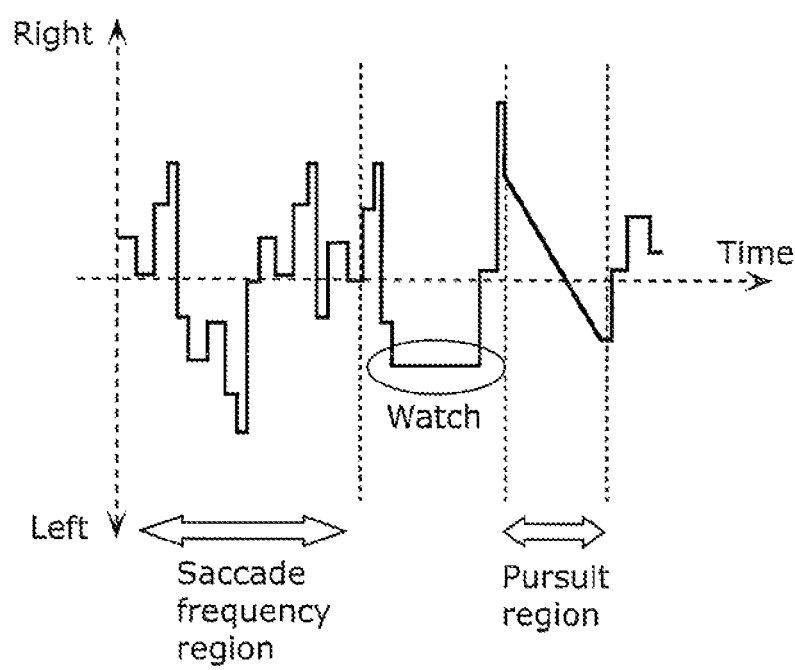
FIG. 11 is a diagram illustrating an eyeball movement.

FIG. 11 is a diagram illustrating an eyeball movement. In FIG. 11, a vertical axis represents an eye electric potential indicating the eyeball movement, while a horizontal axis represents time.

In a frequent saccade region in FIG. 11, an eye electric potential returns to an original electric potential after changing wildly and then stopping for a given period of time. A temporal change in the eye electric potential corresponds to a temporal change detected in the case where an eyeball is moved from an index A to an index B and moved again from the index B to the index B by a saccade.

Generally, a person obtains surrounding information by repeating a visual fixation for about 0.3 second and a saccade for several dozen milliseconds. In other words, in the case where saccades occur frequently, a person is unlikely to be watching a specific subject.

Moreover, pursuit is known as another type of an eyeball movement. This pursuit is an eyeball movement in which an eyeball moves slowly to follow a movement of a visual subject that is moving, in order to continue watching the subject.

Pursuits do not occur in the case where there is no pursuit subject within a view when the eyes are open. In other words, in the case where pursuits occur, a person is likely to be watching a specific subject.

According to Embodiment, the imaging apparatus determines the zoom angle of view with use of these eyeball movements (i.e., saccade and pursuit). Hereafter, the imaging apparatus according to Embodiment shall be described with reference to drawings, and with differences from Embodiment 1 focused on.

Figure 12:
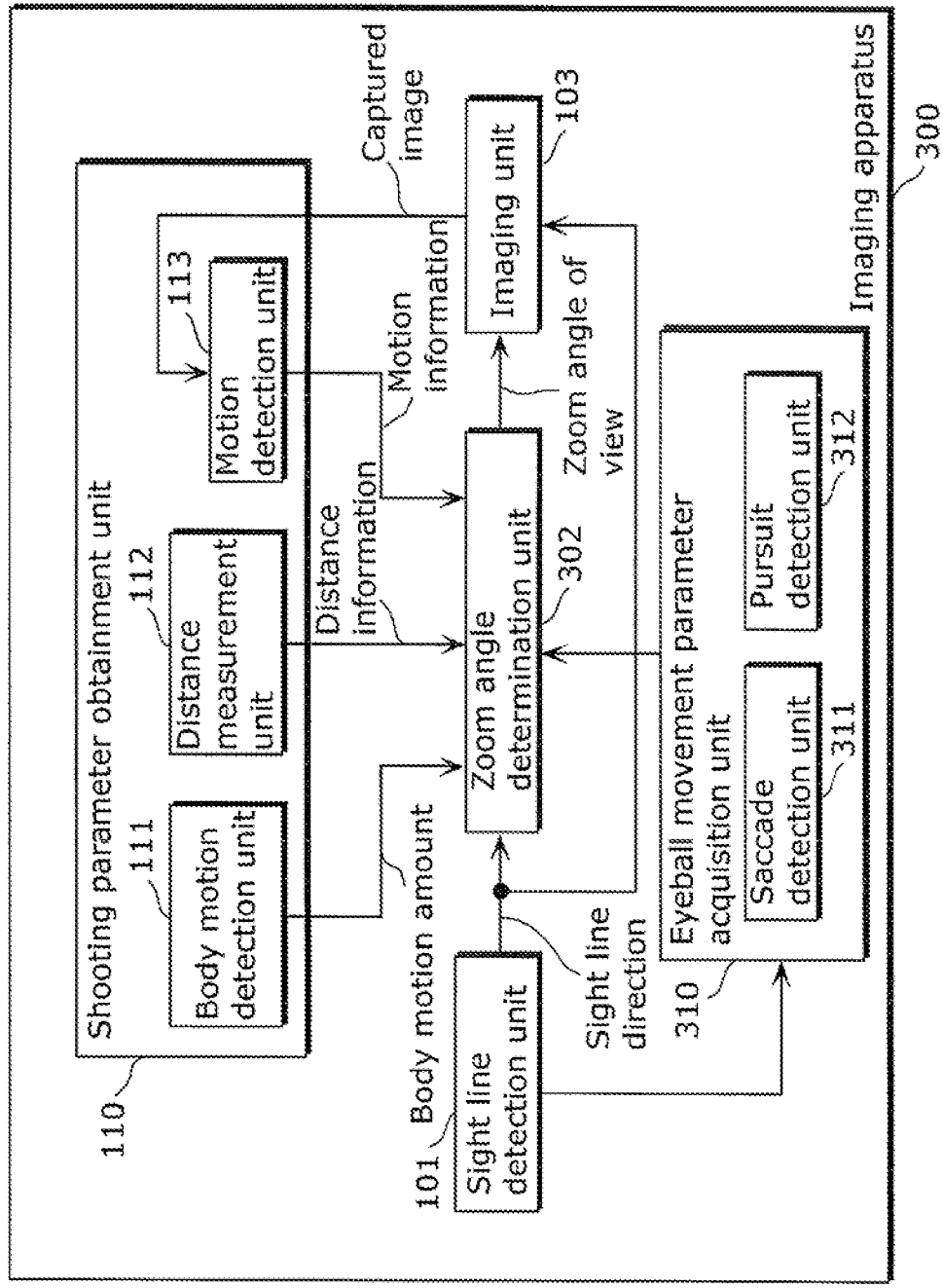
FIG. 12 is a block diagram showing a structure of an imaging apparatus according to Embodiment 3 of the present invention.

FIG. 12 is a block diagram showing a structure of an imaging apparatus 300 according to Embodiment 3 of the present invention. It is noted that description about the components similar to FIG. 1 will be omitted in FIG. 12 with the same reference numerals attached.

The imaging apparatus 300 according to Embodiment includes the sight line detection unit 101, the shooting parameter obtainment unit 110, a zoom angle determination unit 302, the imaging unit 103, and an eyeball movement parameter obtainment unit 310.

The eyeball movement parameter obtainment unit 310 obtains an eyeball movement parameter. The eyeball movement parameter indicates a feature of an eyeball movement of the user during capturing images. As shown in FIG. 12, the eyeball movement parameter obtainment unit 310 includes a saccade detection unit 311 and a pursuit detection unit 312.

The saccade detection unit 311 detects a frequency of saccades (hereafter saccade frequency) within a predetermined time based on a temporal change in sight line direction. Specifically, the saccade detection unit 311, for example, detects a saccade frequency with use of a high-pass filter having a cutoff frequency of 0.05 to 0.1 hertz.

The pursuit detection unit 312 detects a frequency of pursuits (hereafter pursuit frequency) within a predetermined time based on a temporal change in the sight line direction. Specifically, the pursuit detection unit 312, for example, detects a pursuit frequency with use of a low-pass filter having a cutoff frequency of 0.15 to 0.2 hertz.

The zoom angle determination unit 302 determines the zoom angle of view based on variations in a sight line direction, a shooting parameter, and an eyeball movement parameter. At this time, the zoom angle determination unit 302 determines the zoom angle of view such that the zoom angle of view with respect to the variations in the sight line direction becomes larger as a saccade frequency increases. Furthermore, the zoom angle determination unit 302 determines the zoom angle of view such that the zoom angle of view with respect to the variations in the sight line direction becomes smaller as the pursuit frequency increases.

Next, each of the operations of the imaging apparatus 300 configured as mentioned above will be described.

Figure 13A:
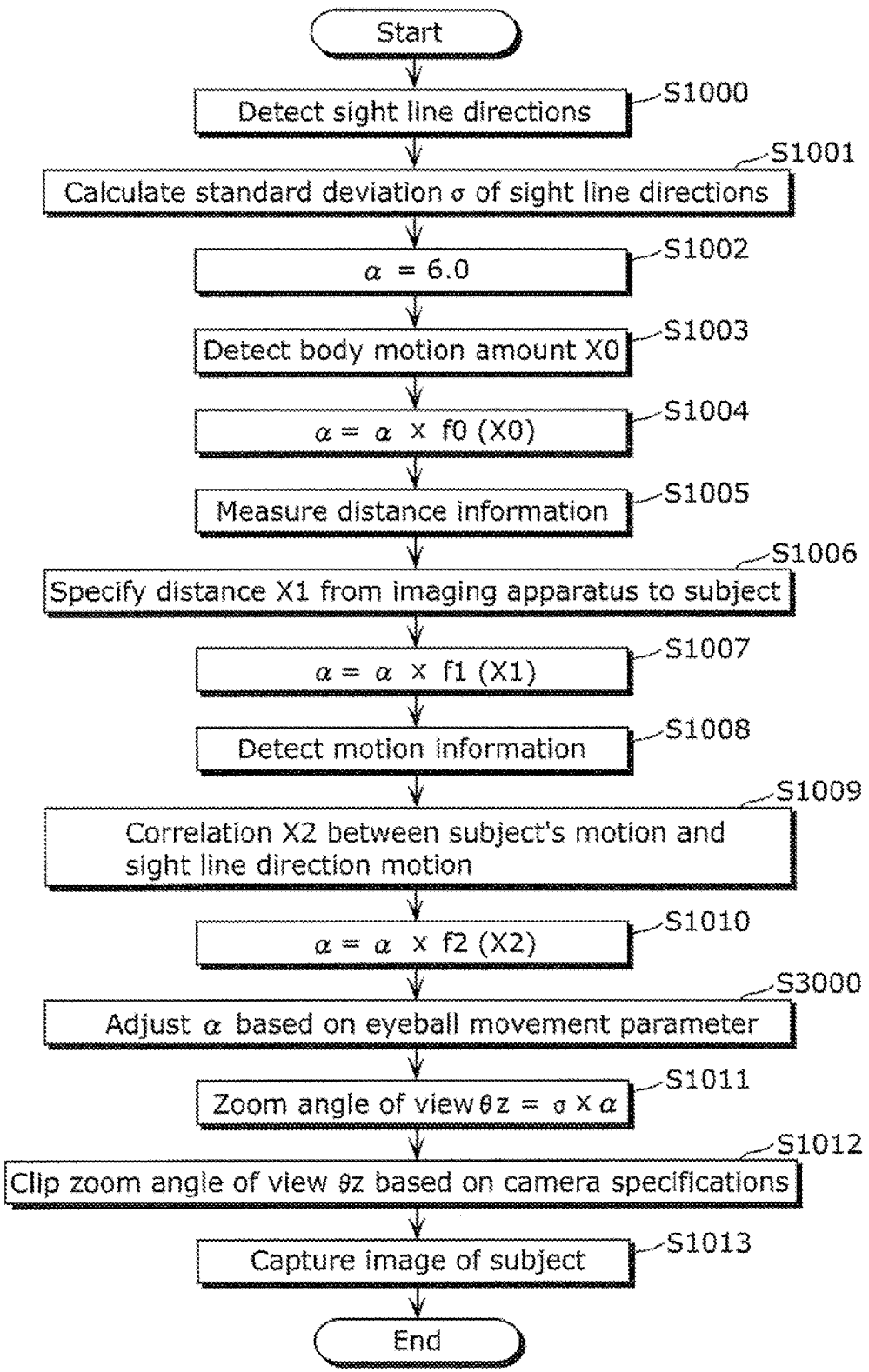
FIG. 13A is a flowchart showing processing operations of the imaging apparatus according to Embodiment 3 of the present invention.

FIG. 13A is a flowchart showing the processing operations of the imaging apparatus 300 according to Embodiment 3 of the present invention. It is noted that description about the steps similar to FIG. 5 will be omitted in FIG. 13A with the same reference numerals attached.

After the processing operation of the step S1010 is performed, the imaging apparatus 300 adjusts a parameter value α based on an eyeball movement parameter (S3000).

Here, a detail of the step S3000 will be described in reference to FIG. 13B.

Figure 13B:
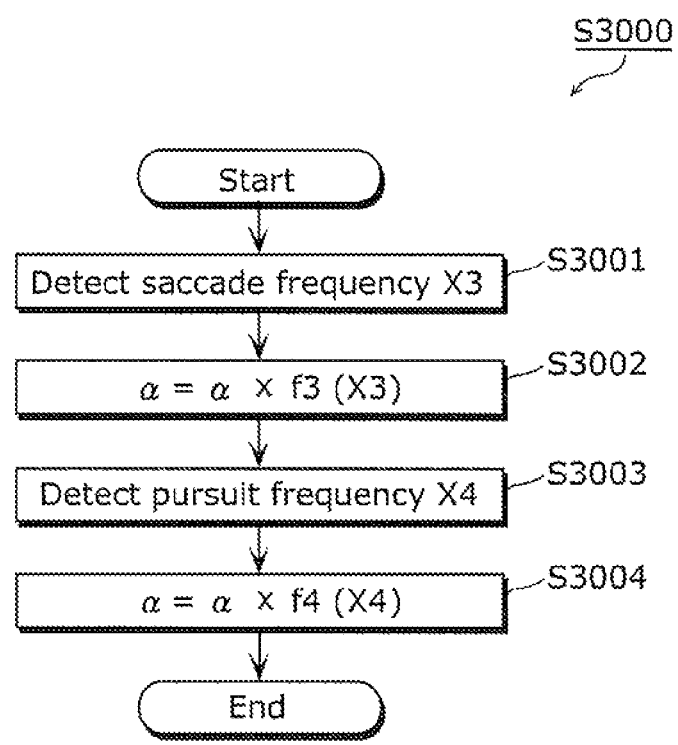
FIG. 13B is a flowchart showing the processing operations related to an eyeball movement parameter of the imaging apparatus according to Embodiment 3 of the present invention.

FIG. 13B is a flowchart showing the processing operations related to the eyeball movement parameters of the imaging apparatus 300 according to Embodiment 3 of the present invention.

The saccade detection unit 311 detects a saccade frequency X3 based on a temporal change in a sight line direction (S3001).

Figure 14A:
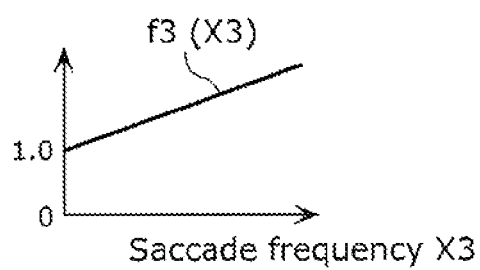
FIG. 14A is a graph plotting an example of a relationship between a frequency of saccades and a converted value according to Embodiment 3 of the present invention.

Next, the zoom angle determination unit 302 adjusts the parameter value α with use of the saccade frequency X3 obtained from the saccade detection unit 311 (S3002). Specifically, the zoom angle determination unit 302, for example, updates the parameter value α by multiplying a converted value f3 (X3) determined from the saccade frequency X3, as indicated in FIG. 14A, for example, by the parameter value α. In other words, the zoom angle determination unit 302 adjusts the parameter value α such that the parameter value α becomes larger as a value of the saccade frequency X3 increases.

Next, the saccade detection unit 312 detects a pursuit frequency X4 based on a temporal change in the sight line direction (S3003).

Figure 14B:
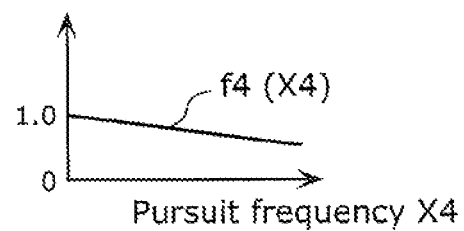
FIG. 14B is a graph plotting an example of a relationship between a frequency of pursuits and a converted value according to Embodiment 3 of the present invention.
Figure 15:
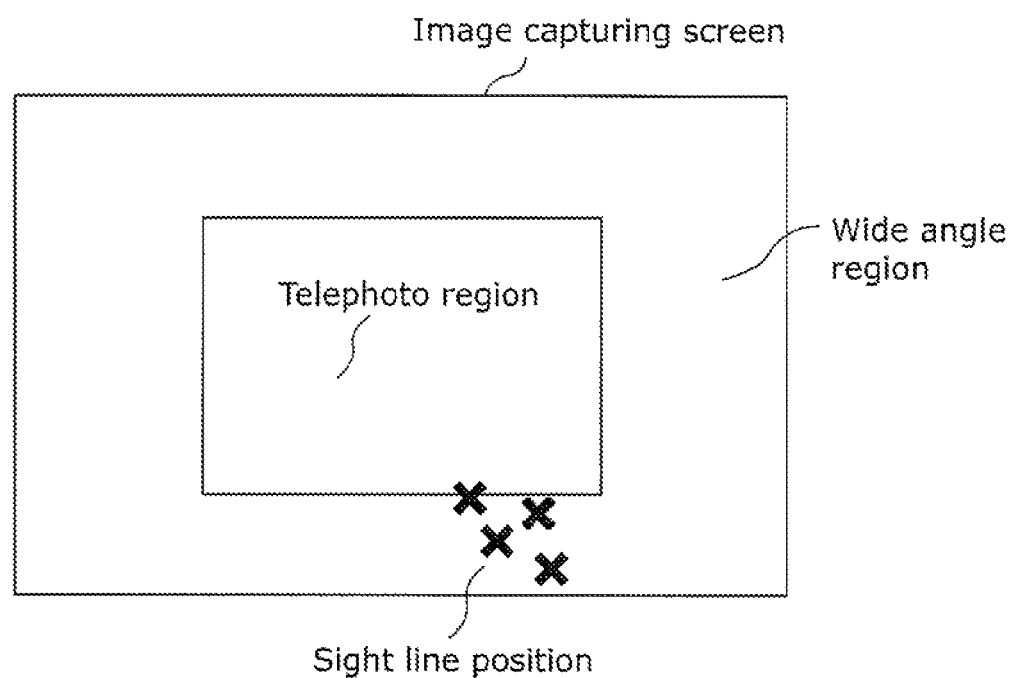
FIG. 15 is a diagram illustrating an example of a image capturing screen displayed in a finder included in a conventional head-mounted imaging apparatus.

Furthermore, the zoom angle determination unit 302 adjusts the parameter value α with use of the pursuit frequency X4 obtained from the pursuit detection unit 312 (S3004). Specifically, the zoom angle determination unit 102, for example, updates the parameter value α by multiplying a converted value f4 (X4) determined from the pursuit frequency X4, as illustrated in FIG. 14B, for example, by the parameter value α. In other words, the zoom angle determination unit 302 adjusts the parameter value α such that the parameter value α becomes smaller as a value of the pursuit frequency X4 increases.

According to Embodiment 3 as described above, the imaging apparatus 300 can determine the zoom angle of view such that the zoom angle of view with respect to the variations in the sight line direction becomes larger as a saccade frequency increases. Generally, in the case where saccades occur frequently, a person is unlikely to be watching a specific subject. In other words, when the user is not watching the subject, the imaging apparatus 300 can withhold the user from capturing an image of the subject excessively zoomed in.

Moreover, the imaging apparatus 300 can determine the zoom angle of view such that the zoom angle of view with respect to the variations in the sight line direction becomes smaller as a pursuit frequency increases. Therefore, in the case where the sight line direction of the user pursue the motion of the subject, the imaging apparatus 300 can appropriately determine the zoom angle of view such that the zoom angle of view does not become large even though the variations in the sight line direction become large.

It is noted that according to Embodiment, the zoom angle determination unit 302 adjusts the parameter value α with use of the amount of body motion X0, the distance X1, the motion correlation X2, the saccade frequency X3, and the pursuit frequency X4, but may use some of these values for adjusting the parameter value α.

Moreover, according to Embodiment, the converted values f3 (X3) and f4 (X4), which linearly change from respective input values, as indicated in FIG. 14A and FIG. 14B, are used for adjusting the parameter value α, but converted values, which nonlinearly change from respective input values, may be used.

Thus, it is noted that although the imaging apparatus according to an aspect of the present invention is described based on the embodiments, the present invention is not limited to such embodiments. As long as there is no deviation from the effect of the present invention, variations of Embodiment conceived by those skilled in the art or a form constructed by a combination of components in different embodiments falls within the scope of this invention.

For example, in Embodiments 1 to 3, the imaging apparatus has the shooting parameter obtainment unit, but is not necessarily required to have the shooting parameter obtainment unit. In this case, for example, the processing of steps S1003 to S1010 illustrated in FIG. 5 may be skipped. Even in this case, the imaging apparatus can appropriately determine the zoom angle of view because the imaging apparatus can determine the zoom angle of view that the zoom angle of view becomes smaller as the variations in the sight line direction of the user decrease.

It is noted that in the above mentioned Embodiments 1-3, the processing for determining the zoom angle of view during image capturing is described as an example. However, the imaging apparatus may record the sight line direction, each piece of sensor information, and captured images, and may determine the zoom angle of view at a time of play. In this case, the imaging apparatus can electronically provide pan and tilt control according to the zoom angle of view and the sight line direction.

Moreover, according to the above mentioned Embodiments 1 to 3, the variations in the sight line direction are expressed by a standard deviation of the sight line direction within a predetermined time, but is not required to be expressed by a standard deviation of the sight line direction within a predetermined time. For example, the variations in the sight line direction may be expressed by any indicator showing a statistical dispersion (for example, range, interquartile range, and the like).

Moreover, a part or all of constituent elements constituting the imaging apparatus according to Embodiments 1 to 3 may be configured from a single system-LSI (Large-Scale Integration). For example, the imaging apparatus may be configured from a system LSI having the sight line detection unit and the zoom angle determination unit.

The system LSI is a super-multi-function LSI manufactured by integrating constituent units on one chip, and is specifically a computer system configured to include a microprocessor, a ROM (Read Only Memory), a RAM (Random Access Memory), and the like. A computer program is stored in the ROM. The system-LSI achieves its function by an operation of the microprocessor according to the computer program.

Furthermore, here, the name used here is system LSI but may be called IC (Integrated Circuit), LSI, super LSI, or ultra LSI depending on a difference in the degree of integration. Moreover, the means of a circuit integration is not limited to an LSI, and implementation with a dedicated communication circuit or a general-purpose processor is also available. It is also acceptable to use a Field Programmable Gate Array that is programmable after the LSI has been manufactured and a reconfigurable processor in which connections and settings of circuit cells within the LSI are reconfigurable.

Furthermore, if an integrated circuit technology that replaces LSI appears through progress in semiconductor technology or other derived technology, that technology can naturally be used to carry out an integration of the constituent elements. Application of biotechnology is one such possibility.

Moreover, the present invention is able to be realized not only as the imaging apparatus including such unique processing units but also the imaging method of designating the unique processing units included in the imaging apparatus as steps. Moreover, the present invention can also be realized as a computer program that leads a computer to implement each of the steps included in the imaging method. As a matter of course, such a computer program is able to be distributed via a computer-readable non-transitory recording medium or a communication network such as the Internet.

The present invention is effective as an apparatus to record and play images and sounds in the broadcasting, communication and accumulation fields. Moreover, the present invention is applicable to such an apparatus as the one to record and play still pictures. Furthermore, the present invention is also applicable to health and medical equipment.

What is claimed is:
1. An imaging apparatus to be worn on a head of a user, the imaging apparatus comprising:
  a sight line detection circuit that detects a sight line direction of the user;

a motion detection circuit that detects motion information indicating motion of a subject;

a zoom angle determination circuit that determines a zoom angle of view to be smaller as a correlation value between the motion of the subject obtained from the motion information and motion of the sight line direction increases; and an imaging circuit that captures an image of the subject according to the zoom angle of view.

2. The imaging apparatus according to claim 1,
wherein the imaging circuit captures an image of the subject positioned in the sight line direction by driving an optical system according to the sight line direction.

3. The imaging apparatus according to claim 1,
wherein the zoom angle determination circuit determines the zoom angle of view to be larger as a difference between a center of the variations in the sight line direction and a direction of an optical axis increases.

4. The imaging apparatus according to claim 1,
wherein the sight line detection circuit detects the sight line direction based on an eye electric potential of the user.

5. The imaging apparatus according to claim 1,
wherein the sight line detection circuit and the zoom angle determination circuit are an integrated circuit.

6. The imaging apparatus according to claim 1,
wherein variations in the sight line direction in a whole screen are expressed by a standard deviation of the sight line direction.

7. An imaging method performed by an imaging apparatus to be worn on a head of a user, the imaging method comprising:
detecting a sight line direction of the user;
detecting motion information indicating motion of a subject;
determining a zoom angle of view to be smaller as a correlation value between the motion of the subject obtained from the motion information and motion of the sight line direction increases; and
capturing an image of the subject according to the zoom angle of view.

8. A non-transitory computer-readable recording medium having a program recorded thereon for causing a computer to execute the imaging method according to claim 7.

* * * * *